(12) United States Patent
Moon et al.

(10) Patent No.: US 8,630,212 B2
(45) Date of Patent: Jan. 14, 2014

(54) APPARATUS AND METHOD FOR DATA TRANSMISSION IN WIRELESS COMMUNICATION SYSTEM

(75) Inventors: Sung Ho Moon, Anyang-si (KR); Jin Sam Kwak, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 13/131,600

(22) PCT Filed: Nov. 23, 2009

(86) PCT No.: PCT/KR2009/006880
§ 371 (c)(1),
(2), (4) Date: May 26, 2011

(87) PCT Pub. No.: WO2010/062086
PCT Pub. Date: Jun. 3, 2010

(65) Prior Publication Data
US 2011/0261730 A1      Oct. 27, 2011

Related U.S. Application Data

(60) Provisional application No. 61/118,443, filed on Nov. 27, 2008, provisional application No. 61/118,444, filed on Nov. 27, 2008, provisional application No. 61/141,658, filed on Dec. 30, 2008, provisional application No. 61/142,601, filed on Jan. 5, 2009.

(30) Foreign Application Priority Data

Apr. 17, 2009  (KR) .................. 10-2009-0033794
May 1, 2009    (KR) .................. 10-2009-0038694

(51) Int. Cl.
*H04J 1/00*         (2006.01)

(52) U.S. Cl.
USPC .......................... 370/281; 370/441

(58) Field of Classification Search
USPC ......................... 370/280, 281, 441
See application file for complete search history.

(56) References Cited

U.S. PATENT DOCUMENTS 7,466,985 B1    12/2008  Handforth et al.
8,204,025 B2     6/2012  Cai et al.
(Continued)

FOREIGN PATENT DOCUMENTS

CN        1368798      9/2002
CN        1525674      9/2004
(Continued)

OTHER PUBLICATIONS

Japan Patent Office Application Serial No. 2010-546701, Office Action dated Oct. 11, 2012, 2 pages.

(Continued)

*Primary Examiner* — Sai-Ming Chan
(74) *Attorney, Agent, or Firm* — Lee, Hong, Degerman, Kang & Waimey

(57) ABSTRACT

A data transmitter for a wireless communication system is provided. Said apparatus comprises an OFDM (Orthogonal Frequency Division Multiplexing) symbol generating part that generates a plurality of OFDM symbols, a frame configuration part that configures a frame comprising includes said plurality of OFDM symbols, and a transmission part that transmits said plurality of OFDM symbols based on said frame that has been configured. Said frame is divided into a plurality of sub-frames, the number of OFDM symbols that are included in an optional sub-frame is any one of 5, 6, and 7, and the bandwidth of said wireless communication system is 8.75 MHz. Based on a new frame configuration, new parameter requirements may be satisfied taking backward compatibility into account.

12 Claims, 30 Drawing Sheets

(56) References Cited

U.S. PATENT DOCUMENTS

| | | |
|---|---|---|
| 2005/0099936 A1 | 5/2005 | Fujii et al. |
| 2005/0192011 A1 | 9/2005 | Hong et al. |
| 2005/0208945 A1 | 9/2005 | Hong et al. |
| 2005/0259629 A1 | 11/2005 | Oliver et al. |
| 2006/0120271 A1* | 6/2006 | Yu et al. ................... 370/208 |
| 2006/0167964 A1* | 7/2006 | Balakrishnan et al. ....... 708/404 |
| 2007/0058595 A1 | 3/2007 | Classon et al. |
| 2007/0070944 A1 | 3/2007 | Rinne et al. |
| 2007/0183306 A1 | 8/2007 | Akita et al. |
| 2007/0268846 A1* | 11/2007 | Proctor et al. .............. 370/279 |
| 2007/0280098 A1 | 12/2007 | Bhatt et al. |
| 2007/0280188 A1 | 12/2007 | Kang et al. |
| 2007/0287449 A1 | 12/2007 | Ju et al. |
| 2008/0039107 A1 | 2/2008 | Ma et al. |
| 2008/0062914 A1 | 3/2008 | Olfat |
| 2008/0075032 A1 | 3/2008 | Balachandran et al. |
| 2008/0080476 A1 | 4/2008 | Cho et al. |
| 2008/0095195 A1 | 4/2008 | Ahmadi et al. |
| 2008/0123569 A1 | 5/2008 | Doss et al. |
| 2008/0130620 A1* | 6/2008 | Liu et al. .................... 370/347 |
| 2008/0175215 A1 | 7/2008 | Oh et al. |
| 2008/0182543 A1 | 7/2008 | Yang et al. |
| 2008/0212692 A1 | 9/2008 | Banerjea et al. |
| 2009/0059845 A1 | 3/2009 | Cooper et al. |
| 2009/0080385 A1 | 3/2009 | Kim et al. |
| 2009/0109890 A1 | 4/2009 | Chow et al. |
| 2009/0122777 A1 | 5/2009 | Tao et al. |
| 2009/0185483 A1 | 7/2009 | McBeath et al. |
| 2009/0252096 A1 | 10/2009 | Liu et al. |
| 2010/0054172 A1 | 3/2010 | Boariu et al. |
| 2011/0044256 A1 | 2/2011 | Chang et al. |
| 2011/0116485 A1 | 5/2011 | Olszewski et al. |

FOREIGN PATENT DOCUMENTS

| | | |
|---|---|---|
| CN | 1964222 | 5/2007 |
| CN | 101005304 | 7/2007 |
| CN | 101009512 | 8/2007 |
| CN | 101026468 | 8/2007 |
| CN | 101542942 | 9/2009 |
| KR | 1020060061013 | 6/2006 |
| KR | 1020070040151 | 4/2007 |
| KR | 10-0821843 | 4/2008 |
| RU | 2005115879 | 1/2006 |
| RU | 2304357 | 8/2007 |
| WO | 03/047117 | 6/2003 |
| WO | 2006000988 | 1/2006 |
| WO | 2006107135 | 10/2006 |
| WO | 2007/069329 | 6/2007 |
| WO | 2007/074525 | 7/2007 |
| WO | 2007/144947 | 12/2007 |

OTHER PUBLICATIONS

Russian Federation for Intellectual Property Application Serial No. 2011125596/07, Notice of Allowance dated Oct. 31, 2012, 8 pages.

Jim Zyren, et al., "Overview of the 3GPP Long Term Evolution Physical Layer," Freescale Semiconductor, Jul. 2007.

X. Zhuang, et al., "Ranging Improvement for 802.16e OFDMA PHY," IEEE 802.16 Broadband Wireless Access Working Group, IEEE C802.16e-04/143r1, Jul. 7, 2004.

United States Patent and Trademark Office U.S. Appl. No. 13/141,313, Office Action dated Jan. 15, 2013, 39 pages.

United States Patent and Trademark Office U.S. Appl. No. 13/141,313, Final Office Action dated Jun. 13, 2013, 15 pages.

The State Intellectual Property Office of the People's Republic of China Application Serial No. 200980153490.6, Office Action dated Jul. 2, 2013, 7 pages.

Zyren, "Overview of the 3GPP Long Term Evolution Physical Layer," Freescale Semiconductor, Inc., Document No. 3GPPEVOLUTIONWP, Jul. 2007, 27 pages.

The State Intellectual Property Office of the People's Republic of China Application Serial No. 200980151718.8, Office Action dated May 6, 2013, 6 pages.

* cited by examiner

Frame Structure Type A-1

Frame Structure Type A-2

Frame Structure Type A-3

Frame Structure Type A-4

Frame Structure Type A-5

Frame Structure Type B-1

Frame Structure Type B-2

Frame Structure Type B-3

Frame Structure Type B-4

Frame Structure Type E-1

Frame Structure Type E-2

Frame Structure Type E-3

▨ : Extra OFDM symbol

APPARATUS AND METHOD FOR DATA TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2009/006880, filed on Nov. 23, 2009, which claims the benefit of earlier filing date and right of priority to Korean Application Nos. 10-2009-0038694, filed on May 1, 2009, and 10-2009-0033794, filed on Apr. 17, 2009, and also claims the benefit of U.S. Provisional Application Ser. Nos. 61/142,601, filed on Jan. 5, 2009, 61/141,658, filed on Dec. 30, 2008, 61/118,444, filed on Nov. 27, 2008, and 61/118,443, filed on Nov. 27, 2008, the contents of which are all hereby incorporated by reference herein in their entirety.

BACKGROUND OF THE INVENTION

1. Field of the Invention

The present invention relates to wireless communication, and more particularly, to an apparatus and method for transmitting data in a wireless communication system.

2. Related Art

The IEEE (Institute of Electrical and Electronics Engineers) 802.16 standard provides technology and a protocol for supporting broadband wireless access. The IEEE 802.16 standard had been standardized since the year 1999, and IEEE 802.16-2001 was approved in the year 2001. IEEE 802.16-2001 is based on a single carrier physical layer called 'WirelessMAN-SC'. After that time, in the IEEE 802.16a standard approved in the year 2003, 'WirelessMAN-OFDM' and 'WirelessMAN-OFDMA' were further added to the physical layer in addition to 'WirelessMAN-SC'. After the IEEE 802.16a standard was completed, a revised IEEE 802.16-2004 standard was approved in the year 2004. In order to correct bugs and errors of the IEEE 802.16-2004 standard, IEEE 802.16-2004/Cor1 (hereinafter referred to as IEEE 802.16e) was completed in the year 2005 in the form of 'corrigendum'.

FIG. 1 shows an example of a frame structure in an IEEE 802.16e system. A frame is a data sequence during a fixed time used by physical specification. For the frame, reference may be made to Paragraph 8.4.4.2 of IEEE standard 802.16-2004 "Part 16: Air Interface for Fixed Broadband Wireless Access Systems" (hereinafter referred to as 'Reference Document 1).

Referring to FIG. 1, the frame includes a downlink (DL) frame and an uplink (UL) frame. Time Division Duplex (TDD) is a scheme in which UL transmission and DL transmission share the same frequency, but they are generated at different times. The DL frame is temporally earlier than the UL frame. The DL frame is started in the sequence of a preamble, an FCH (Frame Control Header), a DL-MAP, an UL-MAP, and a burst region. A guard time for distinguishing the UL frame and the DL frame is inserted into a middle part (between the DL frame and the UL frame) and the last part (next to the UL frame) of the frame. A TTG (transmit/receive transition gap) is a gap between a DL burst and a subsequent UL burst. An RTG (receive/transmit transition gap) is a gap between the UL burst and a subsequent DL burst. The preamble is used for initial synchronization between a base station and user equipment, cell search, a frequency offset, and channel estimation. The FCH includes information about the length of a DL-MAP message and a coding scheme of the DL-MAP. The DL-MAP is a region where the DL-MAP message is transmitted. The DL-MAP message defines the access of a DL channel. The UL-MAP is a region where an UL-MAP message is transmitted. The UL-MAP message defines the access of an UL channel.

Today, an IEEE 802.16m standard (i.e., a new technology standard) is in progress on the basis of the IEEE 802.16e standard. In standardizing IEEE 802.16m, the existing system parameters may be newly defined. Accordingly, frame structures need to be configured so that the newly defined system parameters can be efficiently supported.

Furthermore, IEEE 802.16m (i.e., the newly developed technology standard) has to be designed so that it can support the previously designed IEEE 802.16e standard. The newly designed system technology has to be configured so that it efficiently covers the existing technology (i.e., IEEE 802.16e) and operates. This is called backward compatibility. A frame to satisfy backward compatibility for the existing system is a dual frame. The existing system may refer to an IEEE 802.16e system, and a new system may refer to an IEEE 802.16m system. Accordingly, in the IEEE 802.16m system, research is being carried on frame structures capable of satisfying backward compatibility for the IEEE 802.16e system.

Furthermore, a system profile based on a conventional IEEE 802.16 standard supports only the TDD (Time Division Duplex) scheme, but attempts to support the FDD (Frequency Division Duplex) scheme in which UL transmission and DL transmission are performed at different frequency bands at the same time. Accordingly, for convenience of a system design and share of hardware, it is necessary to design an FDD frame structure having commonness with a TDD frame structure.

SUMMARY OF THE INVENTION

The present invention provides an apparatus and method for transmitting data in a wireless communication system.

According to an aspect of the present invention, a data transmission apparatus in a wireless communication system is provided. The apparatus includes an orthogonal frequency division multiplexing (OFDM) symbol generation unit for generating a plurality of OFDM symbols, a frame configuration unit for configuring a frame including the plurality of OFDM symbols, and a transmission unit for transmitting the plurality of OFDM symbols based on the configured frame. The frame is divided into a plurality of subframes, the number of OFDM symbols included in an arbitrary subframe among the plurality of subframes is one of 5, 6, and 7, and a system bandwidth of the wireless communication system is 8.75 MHz.

According to another aspect of the present invention, a data transmission method in a wireless communication system is provided. The method includes generating a plurality of OFDM symbols, configuring a frame including the plurality of OFDM symbols, and transmitting the plurality of OFDM symbols based on the configured frame. The frame is divided into a plurality of subframes, the number of OFDM symbols included in an arbitrary subframe among the plurality of subframes is one of 5, 6, and 7, and a system bandwidth of the wireless communication system is 8.75 MHz.

In an embodiment, the time length of each of the OFDM symbols is equal to the sum of a CP and a useful symbol time, and a ratio of the CP and the useful symbol time may be 1:8. In another embodiment, the number of the plurality of OFDM symbols is 43. The wireless communication system is a time division duplex (TDD) system in which uplink transmission and downlink transmission are divided in the time domain.

The ratio of downlink subframes used in downlink transmission and uplink subframes used in uplink transmission, within the frame, is N:M, and N+M is one of 6, 7, and 8. At least one OFDM symbol within the frame is used as a transmission/reception (TX/RX) gap for distinguishing contiguous downlink subframes and uplink subframes from each other.

According to yet another aspect of the present invention, a data transmission apparatus in a wireless communication system is provided. The apparatus includes an OFDM symbol generation unit for generating OFDM symbols by performing fast Fourier transform (FFT) and inverse fast Fourier transform (IFFT) for an inputted modulation symbol, a frame configuration unit for configuring a frame, comprising k base subframes each having 6 OFDM symbols generated by the OFDM symbol generation unit, n exceptional subframes each having m OFDM symbols generated by the OFDM symbol generation unit, and a reserved gap having one OFDM symbol generated by the OFDM symbol generation unit, and a data transmission unit for transmitting data using the frame. Here, 6k+mn may be 44, and k may be n.

In an embodiment, m may be 7, and k+n may be 7. In another embodiment, m may be 5, and k+n may be 8. Assuming that the useful symbol time of the OFDM symbol generated by the OFDM symbol generation unit is $T_b$ and a CP is $T_g$, $T_g$ may be $T_b/16$. The wireless communication system may be a time division duplex (TDD) system in which uplink transmission and downlink transmission are divided in a time domain. The reserved gap may be placed at the boundary of a subframe used for the uplink transmission and a subframe used for the downlink transmission. The wireless communication system may be a frequency division duplex (FDD) system in which the uplink transmission and the downlink transmission are divided in a frequency domain. The reserved gap may be used as a midamble used to estimate channel states of a plurality of antennas.

According to further yet another aspect of the present invention, a data transmission apparatus in a wireless communication system. The apparatus includes an OFDM symbol generation unit for generating OFDM symbols by performing FFT and IFFT for an inputted modulation symbol, a frame configuration unit for configuring a frame, comprising k base subframes each having six OFDM symbols generated by the OFDM symbol generation unit, n exceptional subframes each having m OFDM symbols generated by the OFDM symbol generation unit, and a reserved gap having one OFDM symbol generated by the OFDM symbol generation unit, and a data transmission unit for transmitting data using the frame. Here, 6k+mn may be 45.

According to further yet another aspect of the present invention, a data transmission method in a wireless communication system is provided. The method includes generating OFDM symbols by performing FFT and IFFT for an inputted modulation symbol, configuring a frame, including k base subframes each having six OFDM symbols generated by the OFDM symbol generation unit, n exceptional subframes each having m OFDM symbols generated by the OFDM symbol generation unit, and a reserved gap having one OFDM symbol generated by the OFDM symbol generation unit, and transmitting data using the frame. Here, 6k+mn may be 44, and k may be n.

According to the configuration of new frames, backward compatibility can be taken into consideration and, at the same time, new parameter requirements can be satisfied. Furthermore, commonness with heterogeneous frame structures having different system bandwidths can be maintained, and interference between TDD frames supporting different CP (Cyclic Prefix) lengths can be removed.

DESCRIPTION OF EXEMPLARY
EMBODIMENTS

Figure 1:
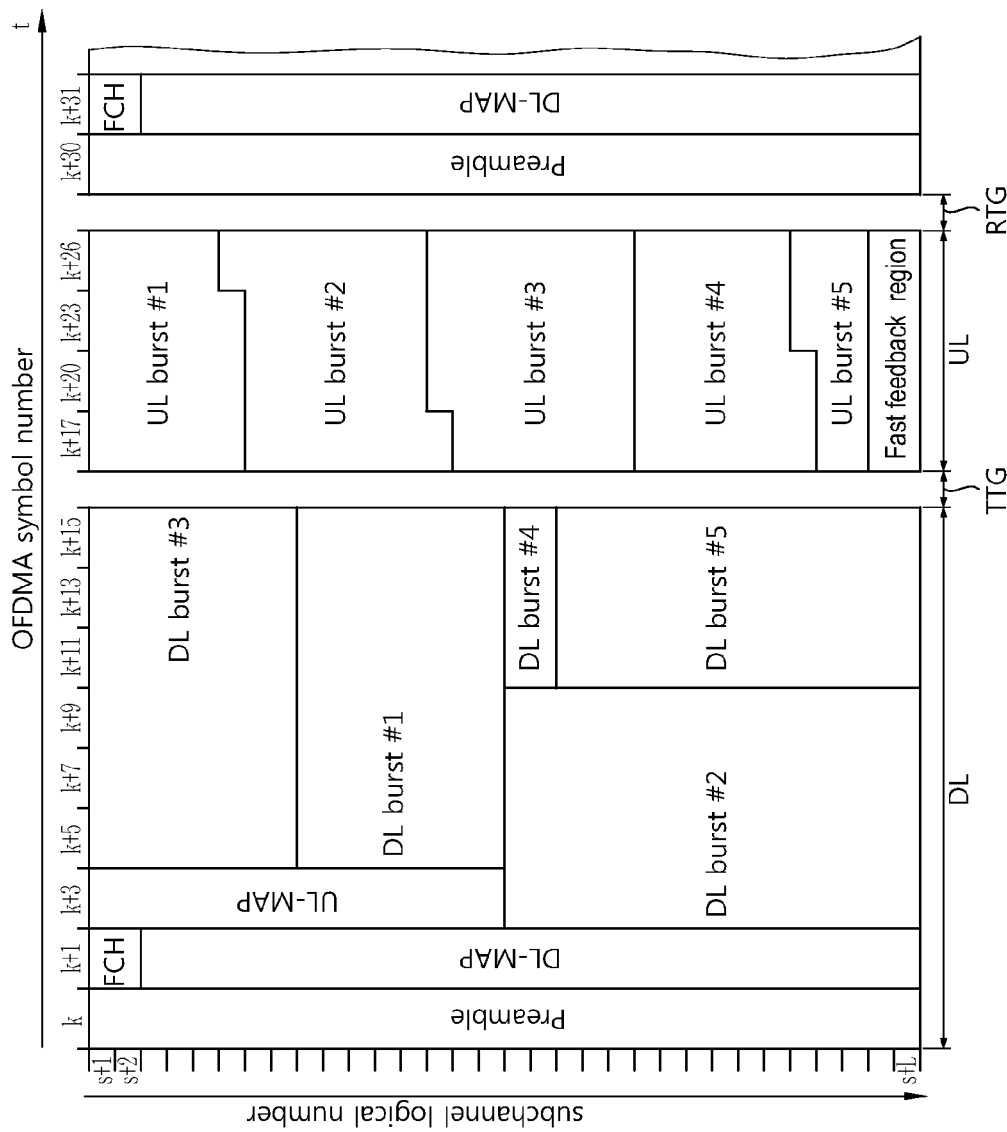
FIG. 1 shows an example of a frame structure in an IEEE 802.16e system.
Figure 2:
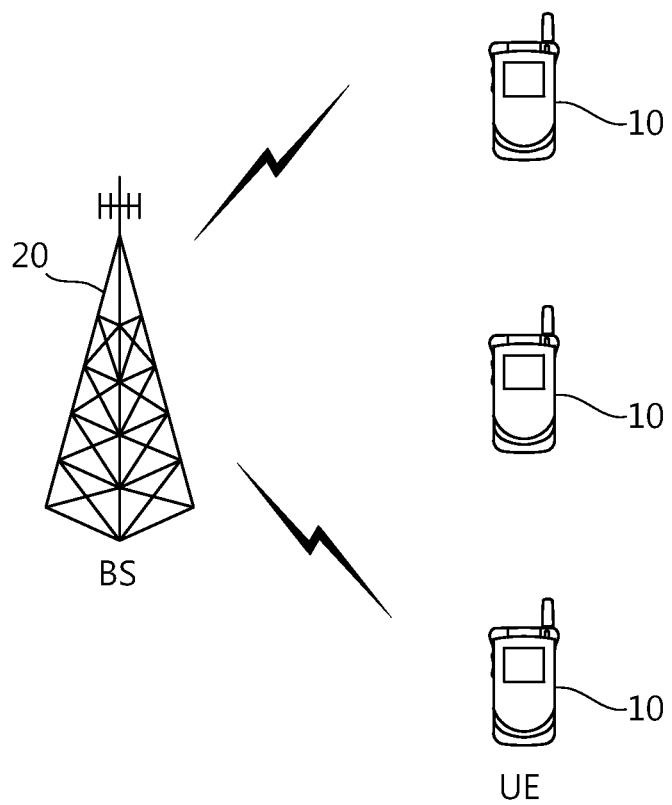
FIG. 2 is a block diagram showing a wireless communication system.

FIG. 2 is a block diagram showing a wireless communication system. The wireless communication systems are widely deployed to provide various communication services, such as voice, packets, and data.

Referring to FIG. 2, the wireless communication system includes UEs (User Equipments) 10 and a BS (Base Station) 20. The UE 10 may be fixed or mobile and may also be referred to as another terminology, such as an MS (Mobile Station), a UT (User Terminal), a Subscriber Station (SS), or a wireless device. The BS 20 commonly refers to a fixed station communicating with the UEs 10 and may also be referred to as another terminology, such as a NodeB (eNB), a Base Transceiver System (BTS), or an access point. One or more cells may exist in one BS 20.

Hereinafter, downlink refers to communication from the BS 20 to the UE 10, and uplink refers to communication from the UE 10 to the BS 20. In downlink, a transmitter may be a part of the BS 20 and a receiver may be a part of the UE 10. In uplink, a transmitter may be a part of the UE 10 and a receiver may be a part of the BS 20.

There is a need for a scheme for distinguishing radio resources used in downlink transmission and radio resources, such as the frequency, time, and code domains used in uplink transmission from each other so that the radio resources do not overlap with each other. The scheme is called duplex. As in multiple access schemes for distinguishing different users from each other, Uplink and downlink can be distinguished from each other in the frequency, time, and code domains. The duplex scheme is chiefly classified into an FDD (Frequency Division Duplex) scheme for distinguishing uplink and downlink from each other according to the frequency and a TDD (Time Division Duplex) scheme for distinguishing uplink and downlink from each other according to the time.

In the FDD scheme, data transmission between a BS and an UE may be consecutively performed in each link in the time domain because uplink and downlink are distinguished from each other in the frequency domain. In the FDD scheme, the frequency of the same size is symmetrically allocated to uplink and downlink. The FDD scheme has been used a lot because it is appropriate for symmetric service, such as voice call. Meanwhile, there is an H-FDD (Half-FDD) scheme which is a kind of the FDD scheme. In the H-FDD scheme, a UE cannot perform uplink transmission and downlink transmission at different frequency bands at the same time, while performing the uplink transmission and the downlink transmission. Accordingly, in the H-FDD system, when UEs belonging to any one group performs uplink transmission, a BS performs downlink transmission for UEs belonging to the other group. That is, uplink and downlink are divided according to the frequency, and respective groups use different times.

The TDD scheme is advantageous in that it is appropriate for asymmetric service because time slots with different ratios can be allocated to uplink and downlink. Another advantage of the TDD scheme is that uplink and downlink have almost the same channel state because uplink and downlink transmission and reception are performed at the same frequency band. Accordingly, the TDD scheme is appropriate for array antenna technology because a channel state can be instantly estimated when a signal is received. The TDD scheme uses the entire frequency band as uplink or downlink. Furthermore, in the TDD scheme, the entire frequency band is used as uplink during a predetermined time because uplink and downlink are divided in the time domain, and data transmission/reception between a BS and an UE cannot be performed at the same time because the entire frequency band is used as downlink during another predetermined time.

The wireless communication system may be an OFDM (Orthogonal Frequency Division Multiplexing) or OFDMA (Orthogonal Frequency Division Multiple Access)-based system. OFDM employs a plurality of orthogonal subcarriers. OFDM employs an orthogonality characteristic between IFFT (Inverse Fast Fourier Transform) and FFT (Fast Fourier Transform). A transmitter generates an OFDM symbol by performing IFFT for data and sends the OFDM symbol. A receiver restores original data by performing IFFT for a received OFDM symbol. A transmitter uses IFFT in order to combine multiple subcarriers, and a receiver uses corresponding FFT in order to separate multiple subcarriers from each other.

Multiple access schemes for downlink transmission and uplink transmission may be different from each other. For example, downlink may use OFDMA (Orthogonal Frequency Division Multiple Access), and uplink may use SC-FDMA (Single Carrier-Frequency Division Multiple Access).

Figure 3:
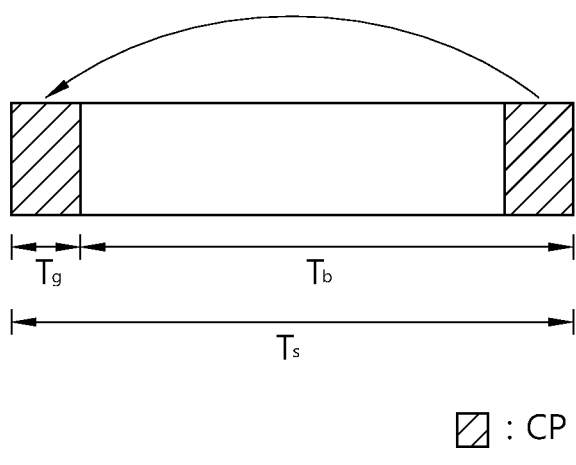
FIG. 3 shows an example of an OFDM symbol structure.

FIG. 3 shows an example of an OFDM symbol structure.

Referring to FIG. 3, the entire time length of one OFDM symbol is $T_s = T_g + T_b$. Here, $T_g$ is a CP (Cyclic Prefix), and $T_s$ is a useful symbol time. The CP is used to remove inter-symbol interference due to multiple paths in an OFDM transmission scheme and may also be called a guard interval or a guard time. $T_b$ is the remaining part in which the CP has been subtracted from $T_s$ and is an OFDM symbol part necessary to restore real data.

Assuming that a ratio of $T_g$ and $T_b$ is G, the following equation is established.

$$T_g = G T_b \qquad \text{[Equation 1]}$$

Here, G=1/8 or 1/16. A CP when G is 1/16 is called a normal CP, and a CP when G is 1/8 is called an extended CP.

The following table shows an example of parameters for an OFDM system. The parameters are system parameters in the IEEE 802.16m standard.

TABLE 1

| | Nominal Channel Bandwidth (MHz) | | | | |
| --- | --- | --- | --- | --- | --- |
| | 5 | 7 | 8.75 | 10 | 20 |
| Over-sampling Factor | 28/25 | 8/7 | 8/7 | 28/25 | 28/25 |
| Sampling Frequency (MHz) | 5.6 | 8 | 10 | 11.2 | 22.4 |
| FFT Size | 512 | 1024 | 1024 | 1024 | 2048 |

TABLE 1-continued

| | | | Nominal Channel Bandwidth (MHz) | | | | |
|---|---|---|---|---|---|---|---|
| | | | 5 | 7 | 8.75 | 10 | 20 |
| | Sub-Carrier Spacing (kHz) | | 10.937500 | 7.812500 | 9.765625 | 10.937500 | 10.937500 |
| | Useful Symbol Time $T_u$ (μs) | | 91.429 | 128 | 102.4 | 91.429 | 91.429 |
| Cyclic Prefix (CP) $G = 1/8$ | | Symbol Time $T_s$ (μs) | 102.857 | 144 | 115.2 | 102.857 | 102.857 |
| | FDD | Number of OFDM symbols per Frame | 48 | 34 | 43 | 48 | 48 |
| | TDD | Idle time (μs) | 62.857 | 104 | 46.40 | 62.857 | 62.857 |
| | | Number of OFDM symbols per Frame | 47 | 33 | 42 | 47 | 47 |
| | | TTG + RTG (μs) | 165.714 | 248 | 161.6 | 165.714 | 165.714 |
| Cyclic Prefix (CP) $G = 1/16$ | | Symbol Time $T_s$ (μs) | 97.143 | 136 | 108.8 | 97.143 | 97.143 |
| | FDD | Number of OFDM symbols per Frame | 51 | 36 | 45 | 51 | 51 |
| | TDD | Idle time (μs) | 45.71 | 104 | 104 | 45.71 | 45.71 |
| | | Number of OFDM symbols per Frame | 50 | 35 | 44 | 50 | 50 |
| | | TTG + RTG (μs) | 142.853 | 240 | 212.8 | 142.853 | 142.853 |
| Cyclic Prefix (CP) $G = 1/4$ | | Symbol Time $T_s$ (μs) | 114.286 | | | 114.286 | 114.286 |
| | FDD | Number of OFDM symbols per Frame | 43 | | | 43 | 43 |
| | TDD | Idle time (μs) | 85.694 | | | 85.694 | 85.694 |
| | | Number of OFDM symbols per Frame | 42 | | | 42 | 42 |
| | | TTG + RTG (μs) | 199.98 | | | 199.98 | 199.98 |

From Table 1, it can be seen that the parameters are independently set according to system transmission bandwidths. In particular, in a system in which the system transmission bandwidth is 8.75 MHz, when G=1/8, the number of OFDM symbols included in a frame per 5 ms is 43. When G=1/16, the number of OFDM symbols included in a frame per 5 ms is 45. There is a need for a method of configuring a frame on which a system can be efficiently operated based on new parameters.

Figure 4:
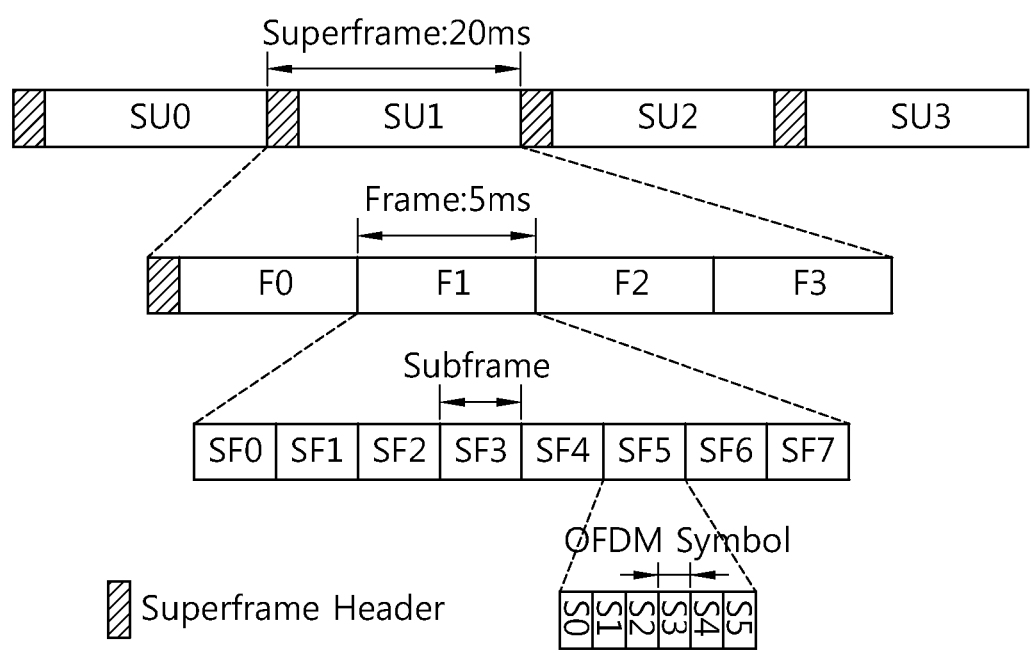
FIG. 4 shows a superframe structure according to an embodiment of the present invention.

FIG. 4 shows a superframe structure according to an embodiment of the present invention.

Referring to FIG. 4, the superframe includes a superframe header SFH and four frames F0, F1, F2, and F3. When the superframe is used, the efficiency of transmission can be increased because the transmission cycle of control information that needs not to be frequently transmitted can be increased in the unit of a superframe. Furthermore, a delay characteristic in data transmission in which a retransmission mechanism is taken into consideration can be reduced because the allocation and scheduling of data are mostly frequently performed in the unit of the superframe. The size of each superframe is illustrated to be 20 ms and the size of each frame is illustrated to be 5 ms, but not limited thereto. A frame may have a variable size for the purpose of compatibility with heterogeneous or legacy wireless communication systems.

A superframe header may be positioned at the head of a superframe, and a common control channel is allocated to the superframe header. The common control channel is a channel used to send control information which may be in common utilized by all UEs within a cell, such as system information or information about frames constituting the superframe. A synchronization signal or a preamble is placed in the superframe header. The preamble is used for initial synchronization between a BS and an UE, cell search, a frequency offset, and channel estimation.

One frame includes k subframes SF0, SF1, SF2 to SF(k−1). K is an integer greater than 0. When a BS and an UE exchanges frames, a minimum size of a TTI (Transmission Time Interval) (i.e., the basic unit of data transmission/reception) is a subframe. FIG. 4 shows an example in which k is 7. The subframe may be composed of 5, 6, or 7 OFDM symbols. TDD (Time Division Duplex) or FDD (Frequency Division Duplex) may be applied to the frame. In TDD, each subframe is used as uplink or downlink in the same frequency at different times. That is, subframes within a TDD frame are divided into an uplink subframe and a downlink subframe in the time domain.

In FDD, each subframe is used as uplink or downlink at different frequencies at the same time. That is, subframes within the FDD frame are divided into subframes for uplink and subframes for downlink in the frequency domain. Here, uplink transmission and downlink transmission occupy different frequency bands and they may be performed at the same time. A midamble is a signal for channel estimation which is transmitted by a BS in order to obtain a channel state for each antenna in an MIMO (Multiple-Input Multiple-Output) system using a plurality of antennas. A UE may estimate a channel state for each antenna of a BS by receiving the midamble.

As described above, in a system in which a system transmission frequency band is 8.75 MHz, when G=1/8, the number of OFDM symbols included in one frame is 43. Furthermore, when G=1/16, the number of OFDM symbols included in one frame is 45. In a TDD system, since the same frequency band is used in both uplink transmission and downlink transmission, the time used for uplink transmission in any one cell may be used for downlink transmission in the other cell. That is, when an uplink period and a downlink period overlap with each other between heterogeneous systems or neighboring cells, interference is generated between neighboring cells.

In such a system, it is necessary to reduce interference between neighboring cells using OFDM symbols with different CP lengths by taking backward compatibility into consideration. In order to satisfy the requirement, it is necessary to configure a frame in which the pilot of the physical layer and the construction and structure of a resource block can be identically maintained by making types of all subframes identical if possible.

Hereinafter, a data transmission apparatus and a data transmission method when G=⅛ and when G=1/16 are disclosed.

1. When G=⅛

Figure 5:
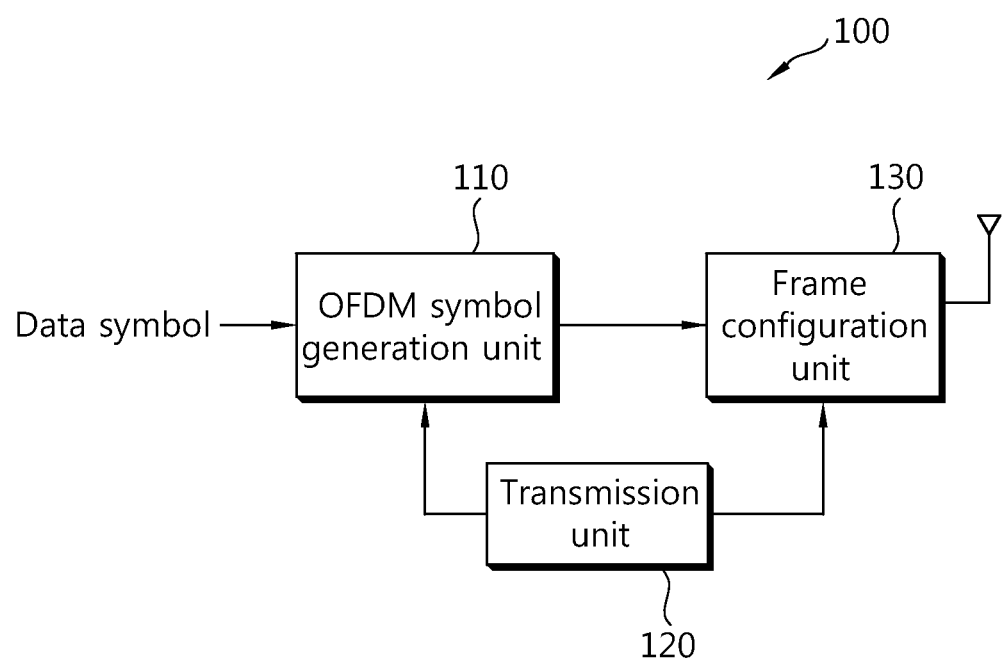
FIG. 5 shows a data transmission apparatus in a wireless communication system according to an embodiment of the present invention.

FIG. 5 shows a data transmission apparatus in a wireless communication system according to an embodiment of the present invention.

Referring to FIG. 5, the data transmission apparatus 100 includes an OFDM symbol generation unit 110, a frame configuration unit 120, and a transmission unit 130.

The OFDM symbol generation unit 110 generates a plurality of OFDM symbols by performing FFT (Fast Fourier Transform) and IFFT (Inverse FFT) for an inputted data symbol. The structure of the OFDM symbol is the same as that described with reference to FIG. 3.

The frame configuration unit 120 configures a frame used in a system bandwidth of 8.75 MHz. The frame includes the plurality of OFDM symbols. A common configuration of the frames is the same as that described with reference to FIG. 4. The frame is classified into a plurality of subframes, and each subframe may include 5, 6, or 7 OFDM symbols. All the subframes may include the same number of OFDM symbols or different numbers of OFDM symbols. However, the number of OFDM symbols included in one frame must be constantly 43. The frame may be a frame of the TDD scheme, the FDD scheme, or an H-FDD scheme.

In the frame of the TDD scheme, transition may be performed between an uplink subframe and a downlink subframe. In order to smoothly perform the transition from the uplink subframe to the downlink subframe or the transition from the downlink subframe to the uplink subframe, a transition gap is inserted. The frame configuration unit 120 may use at least one OFDM symbol as a transmit/receive (TX/RX) transition gap (TTG) or a receive/transmit (RX/TX) transition gap (RTG) for distinguishing contiguous uplink and downlink subframes from each other. The transition gap is also called an idle period.

The frame of the FDD scheme or the H-FDD scheme, unlike the frame of the TDD scheme, does not need the transition gap. Accordingly, the frame configuration unit 120 may allocate one OFDM symbol to a subframe or use one OFDM symbol for other purposes. The OFDM symbol used for other purposes is called an extra OFDM symbol. The extra OFDM symbol may be used as a preamble, a synchronization channel, a midamble, or a sounding signal.

The transmission unit 130 transmits the plurality of OFDM symbols based on the frame configured by the frame configuration unit 120.

Figure 6:
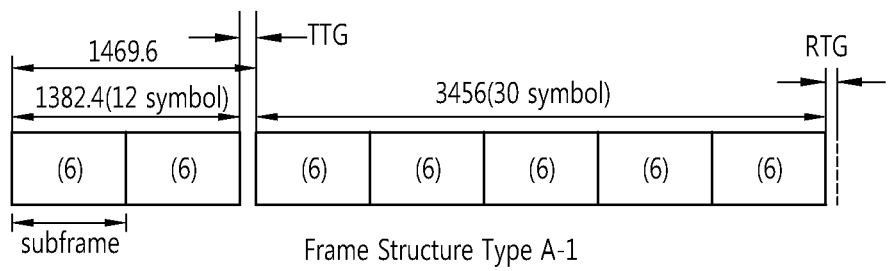
FIG. 6 shows an example of frame structures according to a TDD scheme which are configured by a frame configuration unit according to the present invention.
Figure 6:
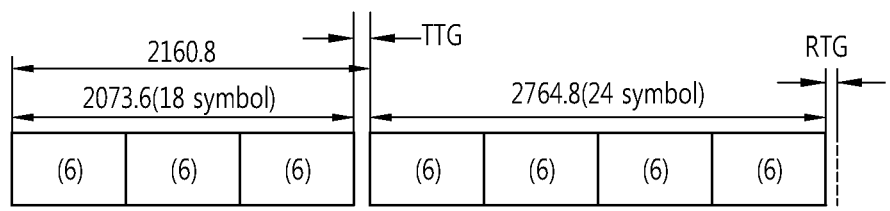
Figure 6:
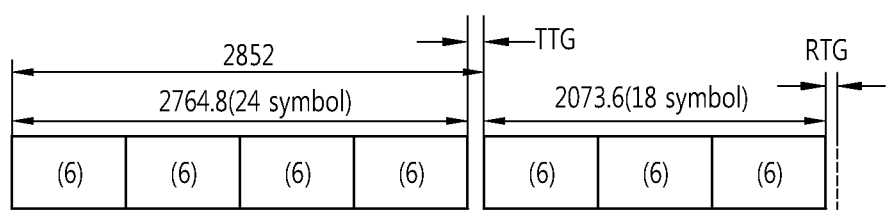
Figure 6:
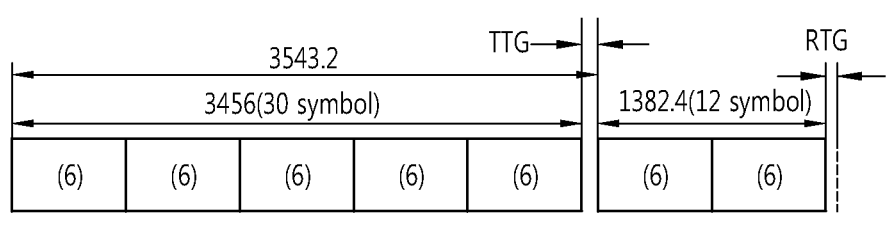
Figure 6:
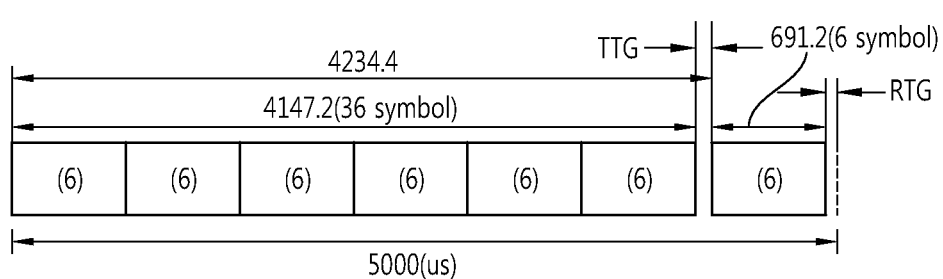

FIG. 6 shows an example of frame structures according to the TDD scheme which are configured by a frame configuration unit according to the present invention.

Referring to FIG. 6, a system transmission bandwidth is 8.75 MHz, and G=⅛. Accordingly, the number of OFDM symbols available within one frame is 43. Frame structure types A-1 to A-5 correspond to a case where the frame is configured using the remaining 42 OFDM symbols other than one OFDM symbol which is used as the TX/RX transition gap TTG or the RX/TX transition gap RTG. A number in parentheses in each subframe indicates the number of OFDM symbols included in the relevant subframe. 7 subframes are included within one frame so that the subframes have the same number of OFDM symbols. Accordingly, each of the 7 subframes includes 6 OFDM symbols.

Accordingly, the number of OFDM symbols included in one frame is 7 (i.e., the number of subframes)×6 (i.e., the number of OFDM symbols per subframe)+1(i.e., the transition gap)=43. According to such a frame configuration, a basic frame structure (i.e., a subframe including 6 OFDM symbols) of the IEEE 802.16m standard can be supported. Furthermore, all the subframes have the same type including the same number of OFDM symbols.

The TX/RX transition gap is placed between contiguous downlink and uplink subframes. That is, subframes before the TX/RX transition gap TTG are downlink subframes, and subframes after the TX/RX transition gap TTG are uplink subframes. Accordingly, frame structure types A-1, A-2, A-3, A-4, and A-5 have 2:5, 3:4, 4:3, 5:2, and 6:1, respectively, in the ratio of the downlink subframes and the uplink subframes. The TX/RX transition gap TTG is 87.2 µs, and the RX/TX transition gap RTG is 74.4 µs.

Figure 7:
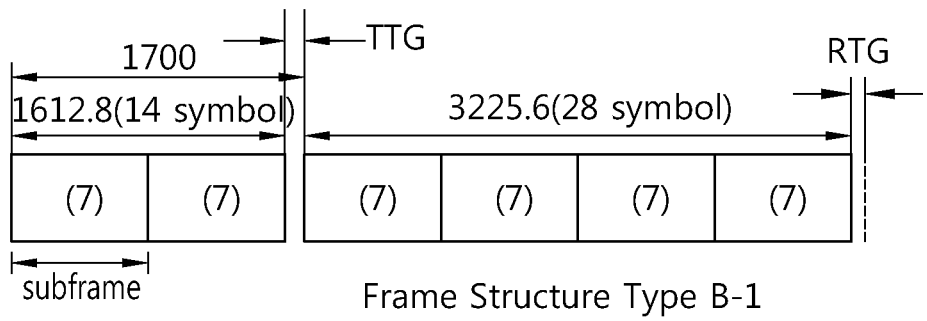
FIG. 7 shows another example of frame structures according to the TDD scheme which are configured by the frame configuration unit according to the present invention.
Figure 7:
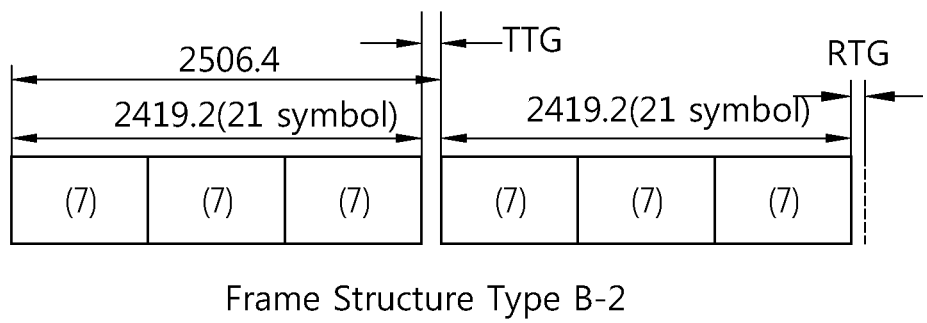
Figure 7:
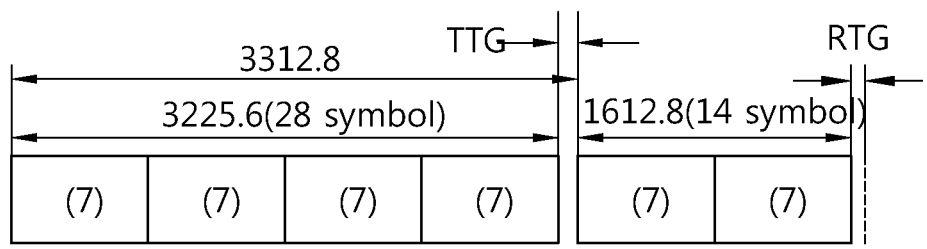
Figure 7:
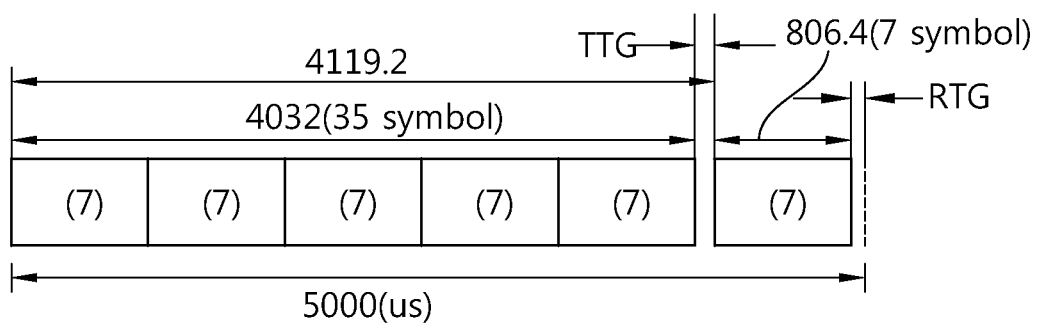

FIG. 7 shows another example of frame structures according to the TDD scheme which are configured by the frame configuration unit according to the present invention.

Referring to FIG. 7, a system transmission bandwidth is 8.75 MHz, and G=⅛. Accordingly, the number of OFDM symbols available within one frame is 43. Frame structure types B-1 to B-5 correspond to a case where a frame is configured using the remaining 42 OFDM symbols other than one OFDM symbol which is used as the TX/RX transition gap or the RX/TX transition gap. 6 subframes are configured within one frame so that subframes have the same number of OFDM symbols. Accordingly, each of the 6 subframes includes 7 OFDM symbols. In this case, the number of OFDM symbols included in one frame is 6 (i.e., the number of subframes)×7 (i.e., the number of OFDM symbols per subframe)+1(i.e., the transition gap)=43. This is the same as a type-2 subframe in IEEE 802.16m.

Since the number of subframes within one frame is an even number, downlink subframes and uplink subframes can be symmetrically allocated. Such symmetric allocation may make smooth the execution of an HARQ process. The frame structure types B-1, B-2, B-3, and B-4 have 2:4, 3:3, 4:2, and 5:1, respectively, in the ratio of the downlink subframes and the uplink subframes.

Figure 8:
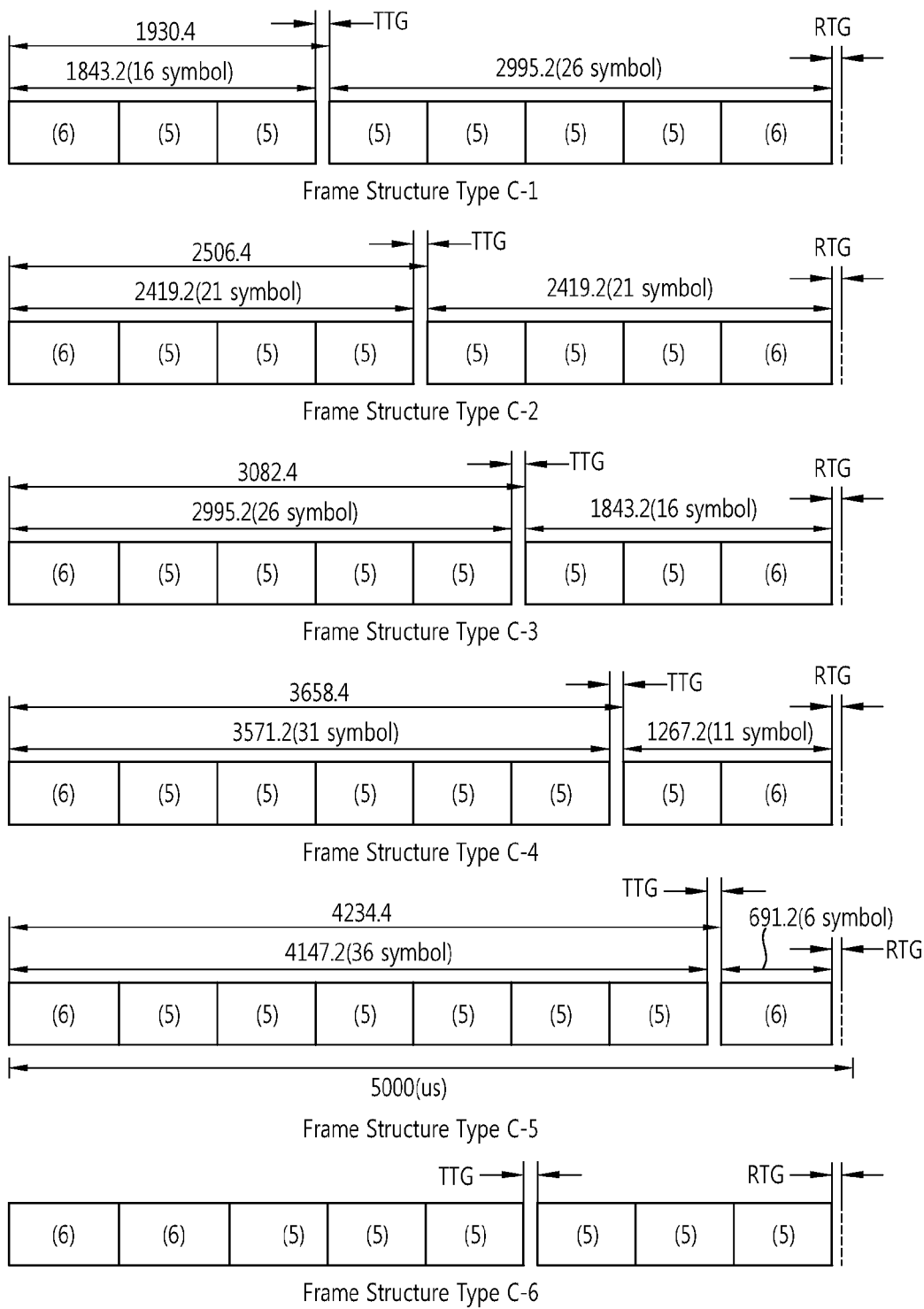
FIG. 8 shows yet another example of frame structures according to the TDD scheme which are configured by the frame configuration unit according to the present invention.

FIG. 8 shows yet another example of frame structures according to the TDD scheme which are configured by the frame configuration unit according to the present invention.

Referring to FIG. 8, a system transmission bandwidth is 8.75 MHz, and G=⅛. Accordingly, the number of OFDM symbols available within one frame is 43. Frame structure types C-1 to C-5 correspond to a case where the frame is configured using the remaining 42 OFDM symbols other than one OFDM symbol which is used as the TX/RX transition gap or the RX/TX transition gap. 8 subframes are configured within one frame. Accordingly, each of the 8 subframes includes 5 or 6 OFDM symbols. That is, each of 6 subframes from among the 8 subframes includes 5 OFDM symbol, and each of the remaining 2 subframes includes 6 OFDM symbols. The frame structure types C-1, C-2, C-3, C-4, C-5, and C-6 have 3:5, 4:4, 5:3, 6:2 and 5:3, respectively, in the ratio of the downlink subframes and the uplink subframes.

In the frame structure types C-1 to C-5, two subframes each including 6 OFDM symbols are placed at both ends of each frame. On the other hand, in the frame structure type C-6, two subframes each including 6 OFDM symbols are placed at the front of the frame. This method can be used to support a frame of IEEE 802.16e in which uplink is 15 OFDM symbols. In the frame structure type C-6, the position of the TX/RX transition gap TTG is between the fifth subframe and the sixth subframe, but this is only illustrative. For example, the TX/RX transition gap TTG may be placed between other subframes.

By dividing one frame into the 8 subframes as described above, the 8 subframes can be made the same as the number of subframes (i.e., 8) per frame which is taken into consideration in system bands of 5, 10, and 20 MHz of IEEE 802.16m. Furthermore, the frame can be made in the same form as control information of the subframe unit, such as an HARQ protocol or a ratio of downlink to uplink which were designed to support the system bands of 5, 10, and 20 MHz. Furthermore, since the number of subframes is an even number, downlink subframes and uplink subframes can be symmetrically allocated. Such symmetric allocation may make smooth the execution of an HARQ process.

Figure 9:
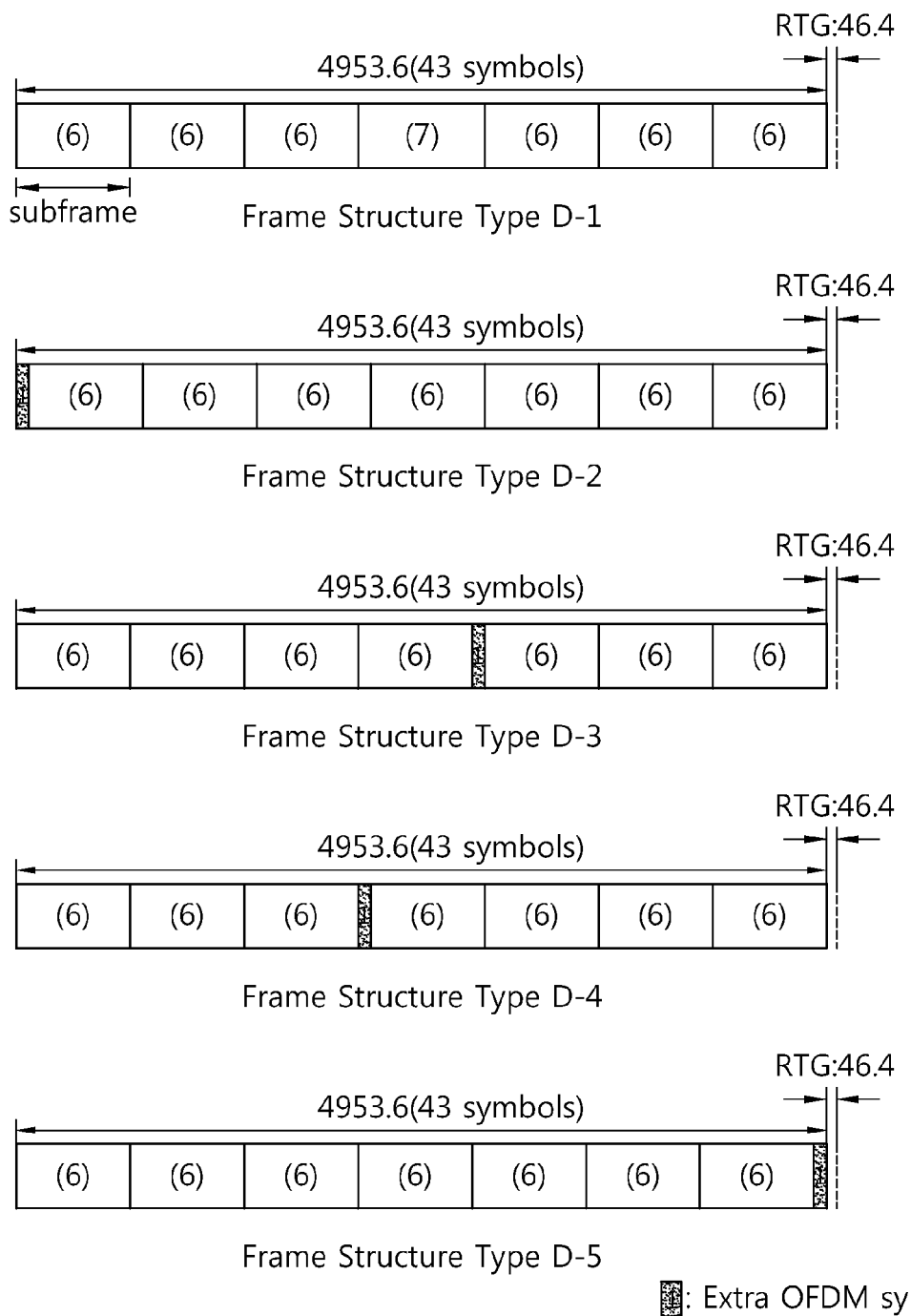
FIG. 9 shows an example of frame structures according to an FDD scheme which are configured by the frame configuration unit according to the present invention.

FIG. 9 shows an example of frame structures according to the FDD scheme which are configured by the frame configuration unit according to the present invention.

Referring to FIG. 9, a system transmission bandwidth is 8.75 MHz, and G=⅛. Accordingly, the number of OFDM symbols available within one frame is 43. Unlike a frame of the TDD scheme, a frame of the FDD scheme or the H-FDD scheme does not require a transition gap. For this reason, the frame configuration unit 120 may allocate all the 43 OFDM symbols to subframes or may use at least one OFDM symbol for other purposes. The at least one OFDM symbol used for other purposes is called an extra OFDM symbol.

Each of frame structure types D-1 to D-5 includes 7 subframes. From among the 7 subframes, only one specific subframe includes 7 OFDM symbols, and each of the remaining subframes includes 6 OFDM symbols. In the specific subframe, there is a high possibility that an additional idle symbol may be generated in a middle portion of the frame by taking an H-FDD frame structure in which an H-FDD UE is taken into consideration and the fact that groups of UEs are divided into two into consideration. Accordingly, it is preferred that the position of the specific subframe be the third, fourth, or fifth subframe.

In the frame structure types D-2 to D-5, each of the subframes includes the same 6 OFDM symbols. Accordingly, one extra OFDM symbol may be used for other purposes according to the system. The frame structure type D-2 corresponds to the frame configuration in which the extra OFDM symbol is placed at the front of the frame. The extra OFDM symbol is used as the control information because pieces of control information of a symbol unit, such as a preamble and an FCH, are chiefly placed at the front part of a frame, and the form of a subframe consisting of 6 OFDM symbols may remain intact for data transmission.

The frame structure types D-3 and D-4 correspond to the frame configurations in which an H-FDD frame or a midamble is taken into consideration. Accordingly, the extra OFDM symbol is placed between the third and the fourth subframes or between the fourth and the fifth subframes.

The frame structure type D-5 corresponds to the frame configuration in which a sounding signal is taken into consideration. Accordingly, the extra OFDM symbol is placed at the end of the frame. In this case, additional control information can be transmitted without damaging the type-1 subframe configuration of IEEE 802.16m.

Figure 10:
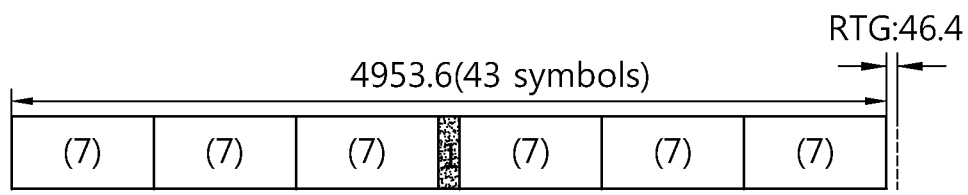
FIG. 10 shows another example of frame structures according to the FDD scheme which are configured by the frame configuration unit according to the present invention.
Figure 10:
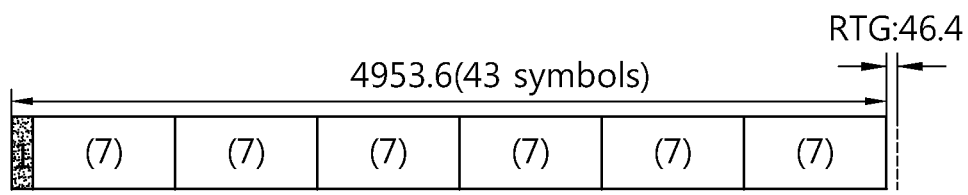
Figure 10:
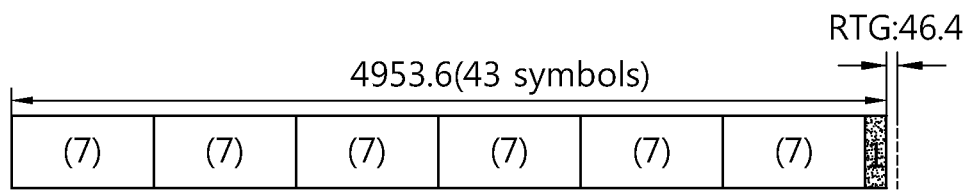

FIG. 10 shows another example of frame structures according to the FDD scheme which are configured by the frame configuration unit according to the present invention.

Referring to FIG. 10, a system transmission bandwidth is 8.75 MHz, and G=⅛. Accordingly, the number of OFDM symbols available within one frame is 43. 6 subframes are configured within one frame. Accordingly, each of the 6 subframes includes 7 OFDM symbols. The remaining one extra OFDM symbol is not included in the subframe. If the extra OFDM symbol is included in the subframe, one subframe includes 8 OFDM symbols. It damages the basic frame configuration of IEEE 802.16m. For this reason, the extra OFDM symbol is used for only other purposes.

A frame structure type D-1 corresponds to a configuration in which the extra OFDM symbol is placed at the center of the frame. The extra OFDM symbol may be used for an H-FDD or midamble.

A frame structure type D-2 corresponds to a configuration in which the extra OFDM symbols is placed at the front of the frame. The extra OFDM symbol is used for essential control information, such as a preamble or an FCH.

A frame structure type D-3 corresponds to a configuration in which a sounding signal is taken into consideration. Accordingly, the extra OFDM symbol is placed at the end of the frame. In this case, additional control information can be transmitted without damaging the type-1 subframe configuration of IEEE 802.16m.

Figure 11:
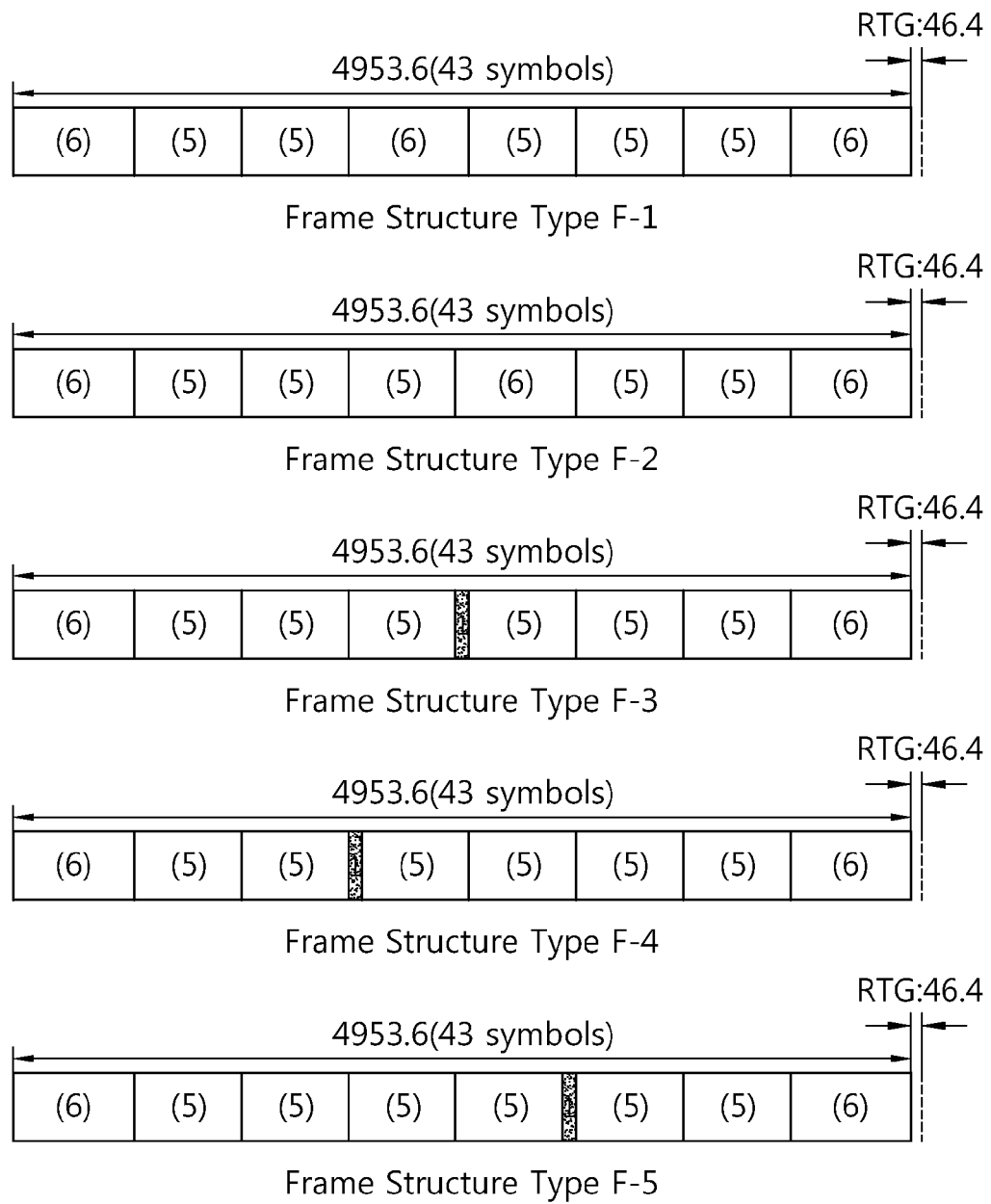
FIG. 11 shows yet another example of frame structures according to the FDD scheme which are configured by the frame configuration unit according to the present invention.

FIG. 11 shows yet another example of frame structures according to the FDD scheme which are configured by the frame configuration unit according to the present invention.

Referring to FIG. 11, a system transmission bandwidth is 8.75 MHz, and G=⅛. Accordingly, the number of OFDM symbols available within one frame is 43. 8 subframes are configured within one frame. Each of the 8 subframes includes 5 or 6 OFDM symbols. A basic configuration is that in order to make the configuration identical to a frame structure of the TDD scheme and the case where G=1/16 in the system bandwidths of 5, 10, and 20 MHz, a subframe having a long length (i.e., a subframe including 6 OFDM symbols) is disposed at the front and end of the frame.

A method of configuring the 8 subframes is as follows. For example, each of 5 subframes of the 8 subframes includes 5 OFDM symbols and each of the remaining 3 subframes thereof includes 6 OFDM symbols. Frame structure types F-1 and F-2 correspond to configurations according to the above method. One of the 3 subframes each including the 6 OFDM symbols preferably is disposed at the center (i.e., in the fourth or fifth subframe) by taking the H-FDD scheme into consideration. In this patent, however, this is only illustrative, and there is no limit to an FDD structure in which one of the 3 subframes is disposed at any position.

For another example, each of 6 subframes of the 8 subframes includes 5 OFDM symbol, each of 2 subframes thereof includes 6 OFDM symbols, and an extra OFDM symbol is 1. Frame structure types F-3 to F-5 correspond to configurations according to this example. A method of independently disposing the extra OFDM symbol may be taken into consideration. The extra OFDM symbol is used for essential control information, such as the H-FDD scheme or a preamble.

2. When G=1/16

Figure 12:
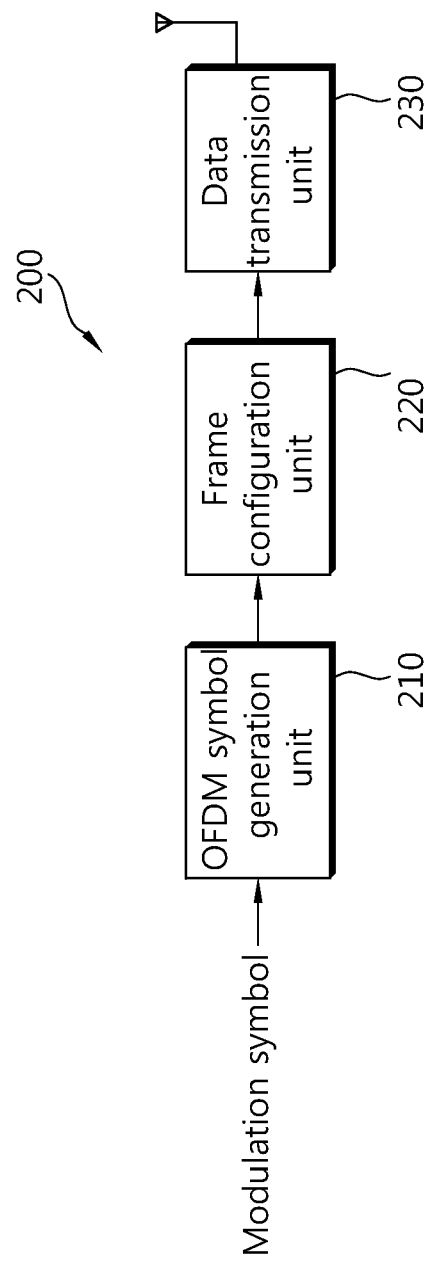
FIG. 12 is a block diagram showing a data transmission apparatus in a wireless communication system according to an embodiment of the present invention.

FIG. 12 is a block diagram showing a data transmission apparatus in a wireless communication system according to an embodiment of the present invention.

Referring to FIG. 12, the data transmission apparatus 200 includes an OFDM symbol generation unit 210, a frame configuration unit 220, and a data transmission unit 230.

The OFDM symbol generation unit 210 generates OFDM symbols by performing FFT and IFFT for an inputted modulation symbol. A structure of the OFDM symbol is the same as that described with reference to FIG. 3.

The frame configuration unit 220 configures a frame used in a system bandwidth of 8.75 MHz. A common structure of the frame is the same as that described with reference to FIG. 4. In an OFDM symbol structure (i.e., $T_g=T_b/16$), the number of OFDM symbols included in one frame has to be constantly 45. The frame includes a plurality of subframes, and each of the subframes is one of a basic subframe and an exceptional subframe. A subframe including 6 OFDM symbols is called the basic subframe, and a subframe including 5 or 7 OFDM symbols is called the exceptional subframe.

The frame configuration unit 220 may organically change the number of basic subframes k, the number of exceptional subframes n, and the number of OFDM symbols included in the exceptional subframe m so that a predetermined number of OFDM symbols can be satisfied. The frame configuration unit 220 may include a reserved gap, constructed of one OFDM symbol, in the frame in addition to the basic subframe and the exceptional subframe. The use of the reserved gap depends on whether a frame is a frame of the TDD scheme, a frame of the FDD scheme, or a frame of the H-FDD scheme. The frame configuration unit 220 may change the positions of the basic subframe, the exceptional subframe, and the reserved gap within the frame. The total number of OFDM symbols within the frame has to be 45. Accordingly, when the reserved gap is included in the frame, 6k+mn=44 is satisfied, and when the reserved gap is not included in the frame, 6k+mn=45 is satisfied. Here, k (i.e., the number of basic subframes)=n (i.e., the number of exceptional subframes).

According to the frame configuration unit 220, the frame can be configured such that a downlink period (or an uplink period) in heterogeneous systems or neighboring cells overlaps with an uplink period (or a downlink period) in a serving cell. In this case, interference between neighboring cells can be reduced, and compatibility with heterogeneous systems can be maintained.

A frame of the FDD scheme or the H-FDD scheme, unlike a frame of the TDD scheme, does not need a transition gap. Accordingly, the frame configuration unit 220 may use the reserved gap as a preamble, a synchronization channel, a midamble, or a sounding signal.

The data transmission unit 230 transmits OFDM symbols based on the frame configured by the frame configuration unit 220.

In the IEEE 802.16e standard and the IEEE 802.16m standard, the basic subframe is also called a type-1 subframe, and the exceptional subframe is also called a type-2 subframe or a type-1 short subframe.

A frame structure including 6k+mn=44, k=5, m=7, and n=2 is described below. This frame structure corresponds to a case where the reserved gap is included in the frame. The frame includes a total of 7 subframes.

Figure 13:
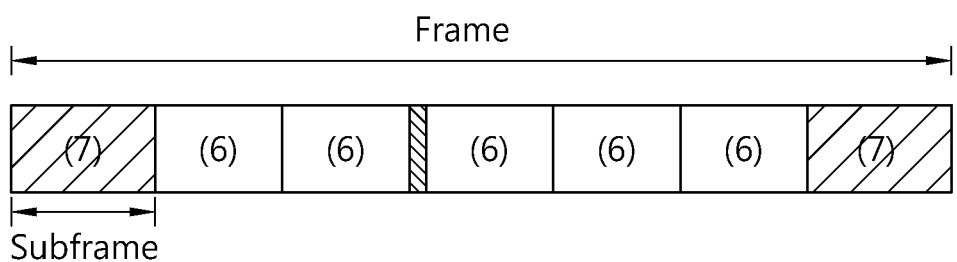
FIG. 13 shows an example of a frame structure configured by the frame configuration unit according to the present invention.

FIG. 13 shows an example of a frame structure configured by the frame configuration unit according to the present invention.

Referring to FIG. 13, the frame includes 5 basic subframes, two exceptional subframes, and one reserved gap. A number in parenthesis within each subframe indicates the number of OFDM symbols included the relevant subframe. This frame may be applied to not only a TDD system, but also an FDD system. When this frame is applied to the TDD system, the reserved gap is used as a transition gap to distinguish downlink and uplink from each other. When this frame is applied to the FDD system, the reserved gap may be used as a midamble.

The two exceptional subframes are illustrated to be disposed on both sides, respectively, based on the reserved gap and the reserved gap is disposed next to the third subframe, but this is only illustrative. The positions of the reserved gap and the exceptional subframes may be modified in various ways. The frame configuration unit 220 may perform such modification by referring to whether the frame is compatible with a frame of a system having a different CP length (e.g., whether transition gaps are identical to each other). This is for the purpose of satisfying backward compatibility and preventing interference between neighboring cells.

Figure 14:
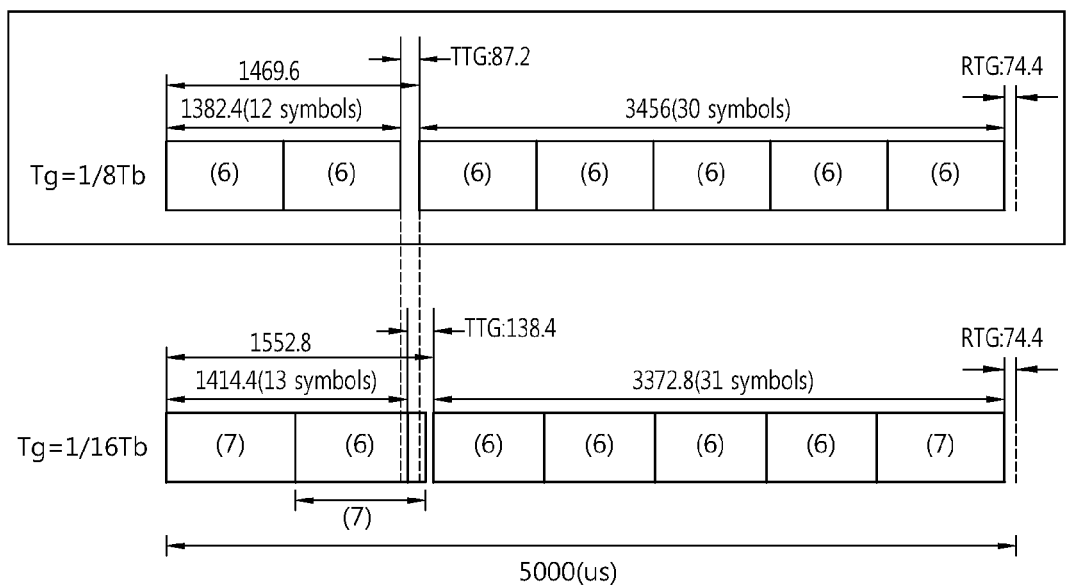
FIG. 14 shows an example of a frame structure derived from the frame structure of FIG. 13.

FIG. 14 shows an example of a frame structure derived from the frame structure of FIG. 13. This frame structure is a TDD frame structure.

Referring to FIG. 14, a frame shown on the upper side is a specific frame structure having $T_g=T_b/8$, and a frame shown on the lower side is a frame structure according to the present invention, having $T_g=T_b/16$ and compatible with the specific frame. Each of the specific frame and the frame according to the present invention has 2:5 in the ratio of uplink subframes and downlink subframes. The specific frame includes 7 basic subframes, each including 6 OFDM symbols, and a TTG and includes a total of 43 OFDM symbols.

A period on the left based on the TTG is a downlink period, and a period on the right based on the TTG is an uplink period. The downlink period includes 13 OFDM symbols and has a length of 1414.4 μs. On the other hand, the uplink period includes a total of 31 OFDM symbols and has a length of 3372.8 μs.

In order for interference not to be generated at the boundary point of uplink and downlink of the specific frame, the frame according to the present invention includes 13 OFDM symbols in the downlink period and 31 OFDM symbols in the uplink period. That is, the remaining two OFDM symbols are added to the downlink period and the uplink period, respectively, as compared with the specific frame structure, and one OFDM symbol is used for transition gaps (TTG and RTG).

Accordingly, the exceptional subframes, each including 7 OFDM symbols, are placed in the downlink period and the uplink period of the frame according to the present invention, respectively. In FIG. 14, the position of the exceptional subframe in the downlink period and the position of the exceptional subframe in the uplink period are illustrated to be at the ends, but they are only illustrative. The position of the exceptional subframe in each period may be changed. Meanwhile, since the TTG is placed between the second and the third subframes, the TTG of a specific frame and the TTG of the frame according to the present invention are identical to each other to some extent. More accurately, it means that the DL end part of the specific frame does not overlap with the UL start part of the frame according to the present invention, and the UL start part of the specific frame does not overlap with the DL end part of the frame according to the present invention. Consequently, the specific frame may coexist with the frame according to the present invention.

Figure 15:
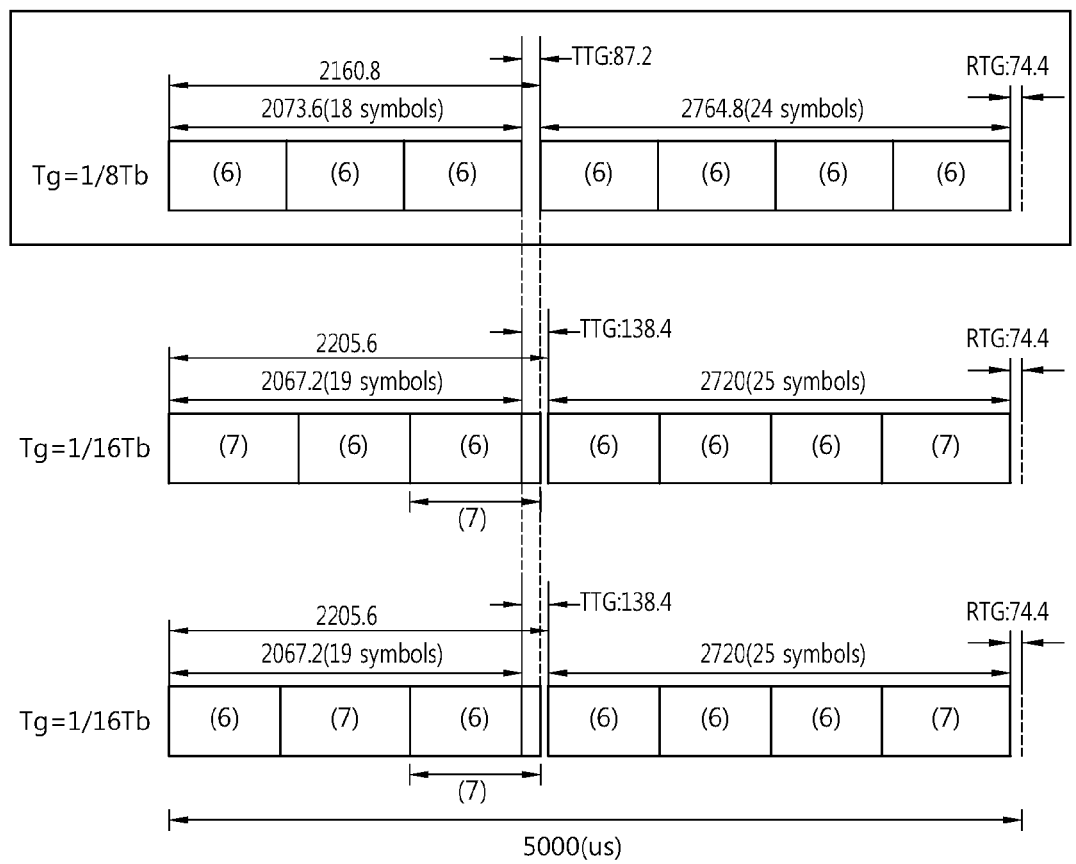
FIG. 15 shows another example of frame structures derived from the frame structure of FIG. 13.

FIG. 15 shows another example of frame structures derived from the frame structure of FIG. 13. This frame structure is a TDD frame structure.

Referring to FIG. 15, a frame at the top is illustrated in order to indicate that it is compatible with a frame according to the present invention. A period on the left side based on a TTG is a downlink period, and an uplink period on the right side based on the TTG is an uplink period. FIG. 15 differs from FIG. 14 in that the ratio of downlink subframes and uplink subframes is 3:5 (i.e., the TTG is placed between the third and the fourth subframes). The frame according to the present invention illustrates that the exceptional subframes are placed on both sides, respectively, based on the TTG and the position of the exceptional subframe in the downlink period may be the first or second subframe. For the same reason as in FIG. 14, an interference problem between uplink and downlink of a specific frame and the frame according to the present invention can be solved.

Figure 16:
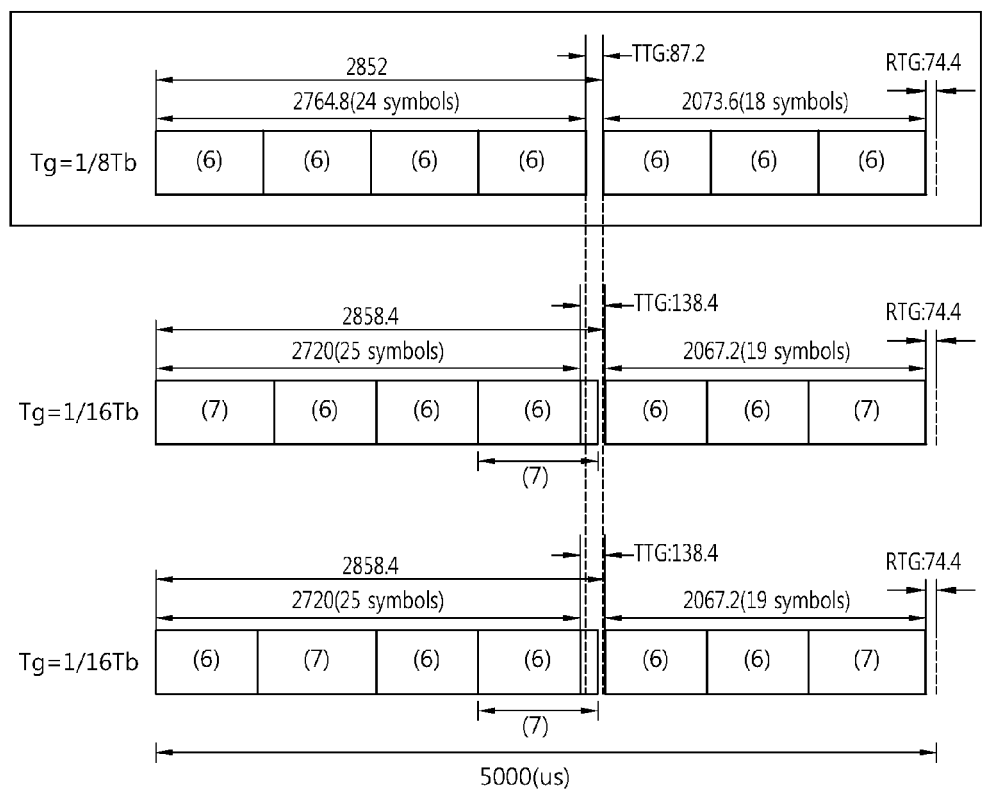
FIG. 16 shows yet another example of frame structures derived from the frame structure of FIG. 13.

FIG. 16 shows yet another example of frame structures derived from the frame structure of FIG. 13. This frame structure is a TDD frame structure.

Referring to FIG. 16, the frame structure has 4:3 in the ratio of downlink subframes and uplink subframes. A period on the left side based on a TTG is a downlink period, and an uplink period on the right side based on the TTG is an uplink period. The frame structure according to the present invention illustrates that the position of an exceptional subframe in the downlink period may be the first or second subframe. For the same reason as in FIGS. 14 and 15, an interference problem between uplink and downlink of a specific frame and the frame according to the present invention can be solved.

Figure 17:
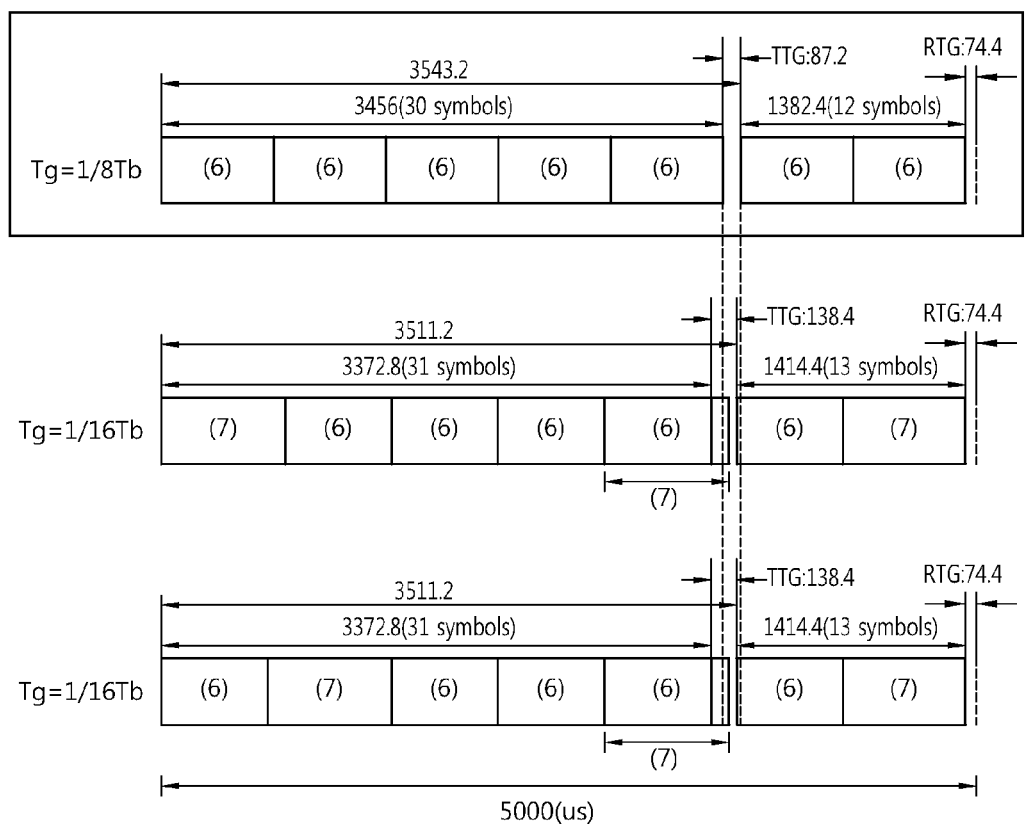
FIG. 17 shows further yet another example of frame structures derived from the frame structure of FIG. 13.

FIG. 17 shows further yet another example of frame structures derived from the frame structure of FIG. 13. This frame structure is a TDD frame structure.

Referring to FIG. 17, the frame structure has 5:2 in the ratio of downlink subframes and uplink subframes. A period on the left side based on a TTG is a downlink period, and an uplink period on the right side based on the TTG is an uplink period. The frame structure according to the present invention illustrates that the position of an exceptional subframe in the downlink period may be the first or second subframe. For the same reason as in FIGS. 14 to 16, an interference problem between uplink and downlink of a specific frame and the frame according to the present invention can be solved.

Figure 18:
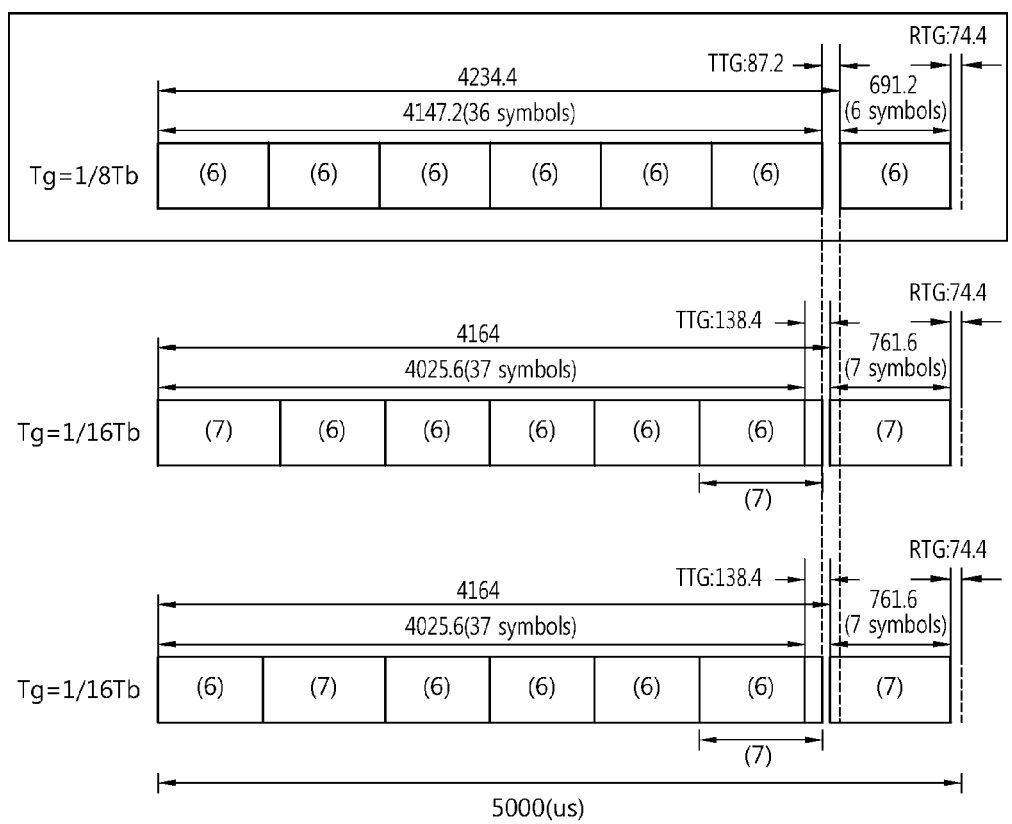
FIG. 18 shows further yet another example of frame structures derived from the frame structure of FIG. 13.

FIG. 18 shows further yet another example of frame structures derived from the frame structure of FIG. 13. This frame structure is a TDD frame structure.

Referring to FIG. 18, the frame structure has 6:1 in the ratio of downlink subframes and uplink subframes. A period on the left side based on a TTG is a downlink period, and an uplink period on the right side based on the TTG is an uplink period. The frame structure according to the present invention illustrates that the position of an exceptional subframe in the downlink period may be the first or second subframe. For the same reason as in FIGS. 14 to 17, an interference problem between uplink and downlink of a specific frame and the frame according to the present invention can be solved.

Figure 19:
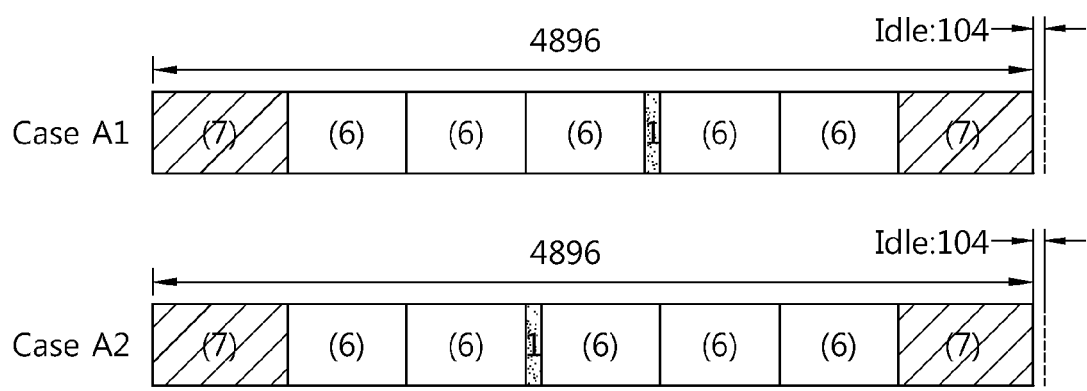
FIG. 19 shows further yet another example of frame structures derived from the frame structure of FIG. 13.

FIG. 19 shows further yet another example of frame structures derived from the frame structure of FIG. 13. This frame structure is an FDD frame structure. It is preferred that the FDD frame structure have the same form as a TDD structure. This is because in the design of a physical layer taken into consideration when a system is designed, the design of a channel for essential control information or additional control information can be reused. In the FDD structure, a TTG and an RTG, such as those in the TDD structure, are not required. Accordingly, whether one OFDM symbol will be used as a reserved gap or one exceptional subframe will be additionally configured without the reserved gap may be selected. FIG. 19 shows the FDD frame structure including the reserved gap.

Referring to FIG. 19, Case A1 and Case A2 are identical to each other in that the exceptional subframes are placed at both ends of each of the frames, but are different from each other in the position of the reserved gap. The reserved gap in the frame of Case A1 is placed between fourth and fifth subframes, and the reserved gap in the frame of Case A2 is placed between third and fourth subframes. The position of the reserved gap may be changed by taking H-FDD into consideration.

Figure 20:
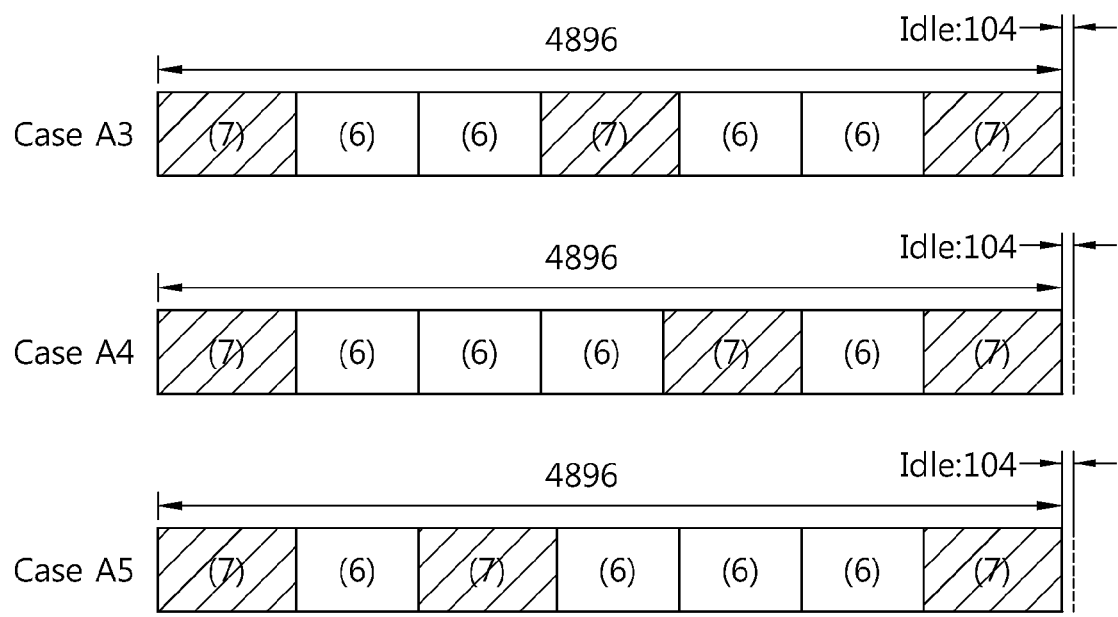
FIG. 20 shows another example of frame structures configured by the frame configuration unit according to the present invention.

FIG. 20 shows another example of frame structures configured by the frame configuration unit according to the present invention. This frame structure is an FDD frame structure in which one additional exceptional subframe is further added without a reserved gap. Accordingly, this frame structure has 6k+mn=45, k=4, m=7, and n=3.

Referring to FIG. 20, each of the frame structures Case A3, Case A4, and Case A5 has 4 basic subframes and 3 exceptional subframes. Furthermore, the exceptional subframes are placed at both ends of each of the frame structures. However, Case A3, Case A4, and Case A5 differ from each other in that the additional exceptional subframes are placed in fourth, fifth, and third subframes, respectively. This frame structure has been made by taking an H-FDD structure into consideration. When the H-FDD structure is taken into consideration, an additional idle period is necessary between groups. To this end, it is preferred that an additional space is formed through the exceptional subframe.

Hereinafter, a frame structure having 6k+mn=44, k=4, m=5, and n=4 is described. This frame structure corresponds to a case where a reserved gap is included in a frame. The frame includes a total of 8 subframes.

Figure 21:
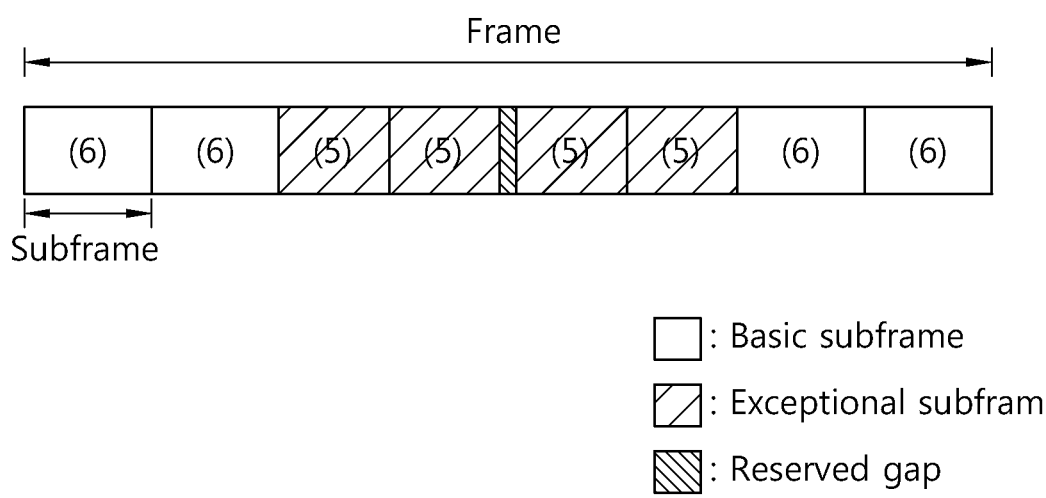
FIG. 21 shows yet another example of a frame structure configured by the frame configuration unit according to the present invention.

FIG. 21 shows yet another example of a frame structure configured by the frame configuration unit according to the present invention.

Referring to FIG. 21, the frame includes 4 basic subframes, 4 exceptional subframes, and a reserved gap. This frame may be applied to not only a TDD system, but also an FDD system. When this frame is applied to the TDD system, the reserved gap is used as a transition gap to distinguish downlink and uplink from each other. When this frame is applied to the FDD system, the reserved gap may be used as a midamble.

The reserved gap is illustrated to be placed between fourth and fifth subframes, but this is only illustrative. The position of the reserved gap and the positions of the exceptional subframes may be modified in various ways. The frame configuration unit 120 may perform such modification by referring to whether a frame is compatible with a frame of a system having a different CP length (e.g., whether transition gaps are identical to each other). This is for the purpose of satisfying backward compatibility and preventing interference between neighboring cells.

Figure 22:
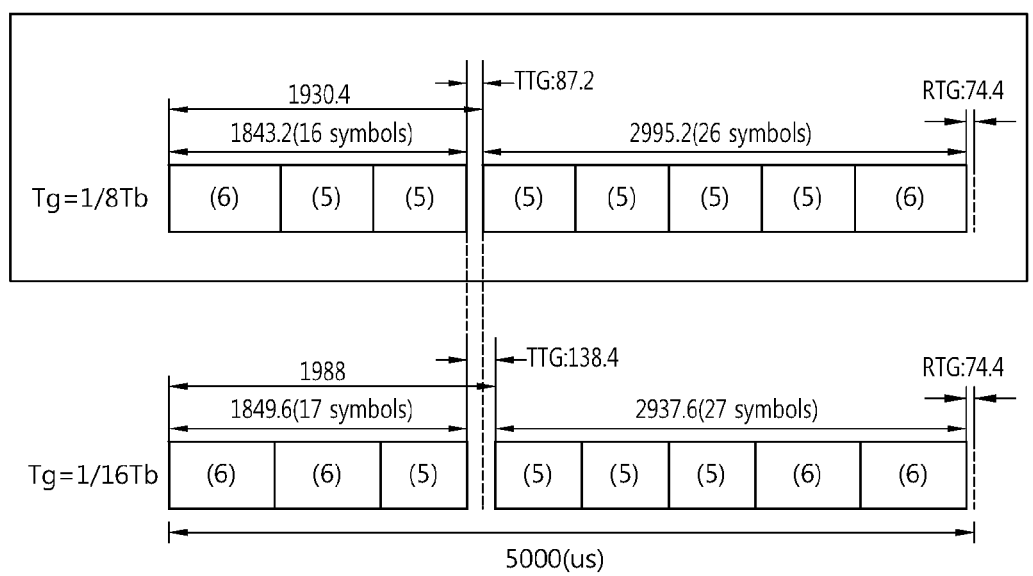
FIG. 22 shows an example of a frame structure derived from the frame structure of FIG. 21.

FIG. 22 shows an example of a frame structure derived from the frame structure of FIG. 21. This frame structure is a TDD frame structure.

Referring to FIG. 22, a specific frame structure having a CP length of $T_b/8$ is shown on the upper side, and the frame structure according to the present invention, having a CP length of $T_b/16$ and satisfying backward compatibility with the specific frame structure, is shown on the lower side. Each of the frame structures has 3:5 in the ratio of downlink subframes and uplink subframes. A period on the left side based on a TTG is a downlink period, and a period on the right side based on the TTG is an uplink period. The frame structure according to the present invention includes two exceptional subframes in each of the downlink period and the uplink period. It is preferred that a first subframe in the downlink period be configured as a basic subframe in order to obtain commonness with a superframe header structure when a system bandwidth is 5 MHz, 10 MHz, or 20 MHz. In this case, an interference problem between uplink and downlink of the specific frame and the frame according to the present invention can be solved.

Figure 23:
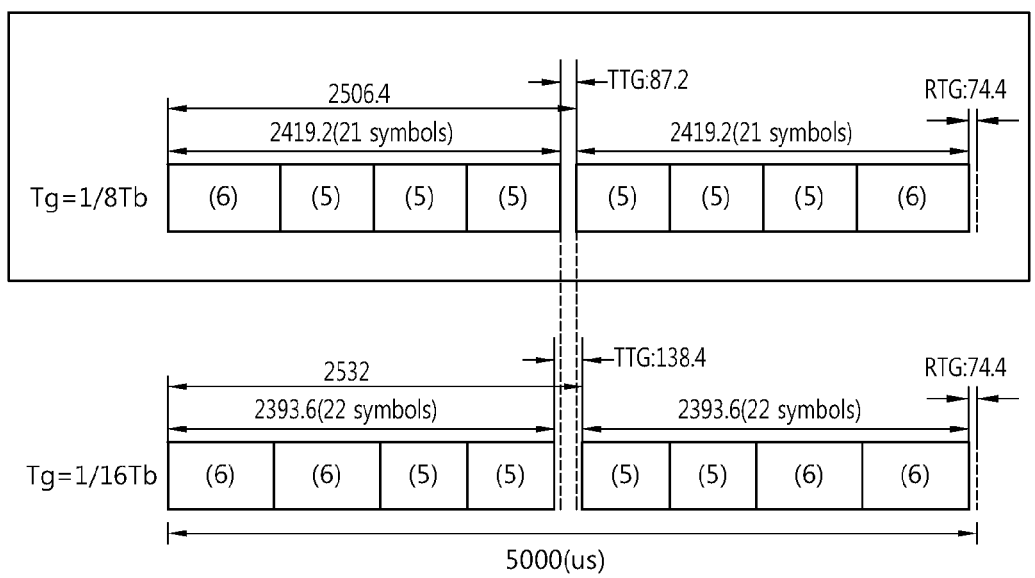
FIG. 23 shows another example of a frame structure derived from the frame structure of FIG. 21.

FIG. 23 shows another example of a frame structure derived from the frame structure of FIG. 21. This frame structure is a TDD frame structure.

Referring to FIG. 23, a specific frame structure having a CP length of $T_b/8$ is shown on the upper side, and the frame structure according to the present invention, having a CP length of $T_b/16$ and satisfying backward compatibility with the specific frame structure, is shown on the lower side. The ratio of downlink subframes and uplink subframes within the frame is 4:4. The frame according to the present invention has a structure in which a downlink period is accurately matched with an uplink period. In this case, there is an advantage in that an HARQ can be performed very easily.

Figure 24:
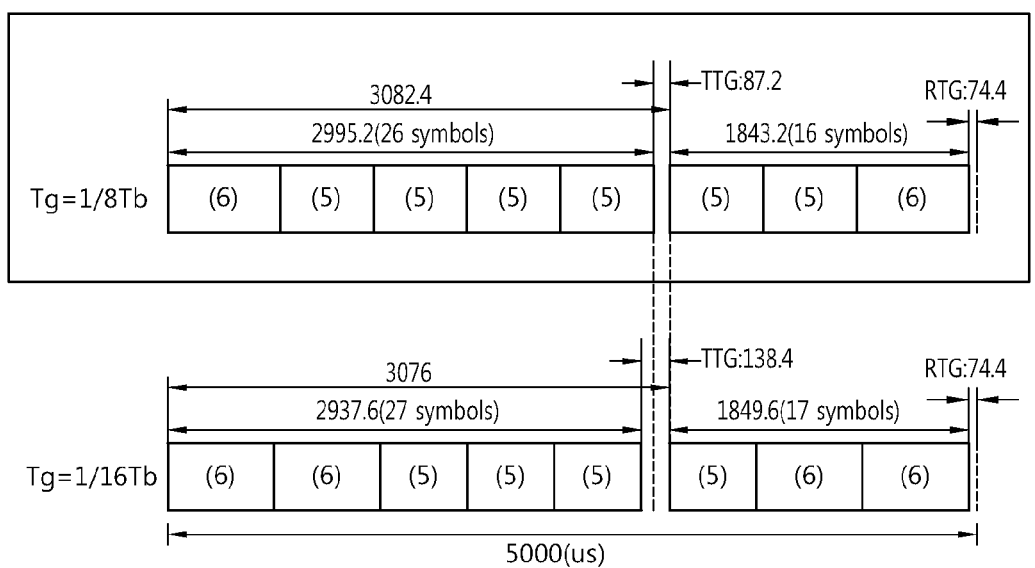
FIG. 24 shows yet another example of a frame structure derived from the frame structure of FIG. 21.

FIG. 24 shows yet another example of a frame structure derived from the frame structure of FIG. 21. This frame structure is a TDD frame structure.

Referring to FIG. 24, a specific frame structure having a CP length of $T_b/8$ is shown on the upper side, and the frame structure according to the present invention, having a CP length of $T_b/16$ and satisfying backward compatibility with the specific frame structure, is shown on the lower side. The ratio of downlink subframes and uplink subframes within the frame is 5:3.

Figure 25:
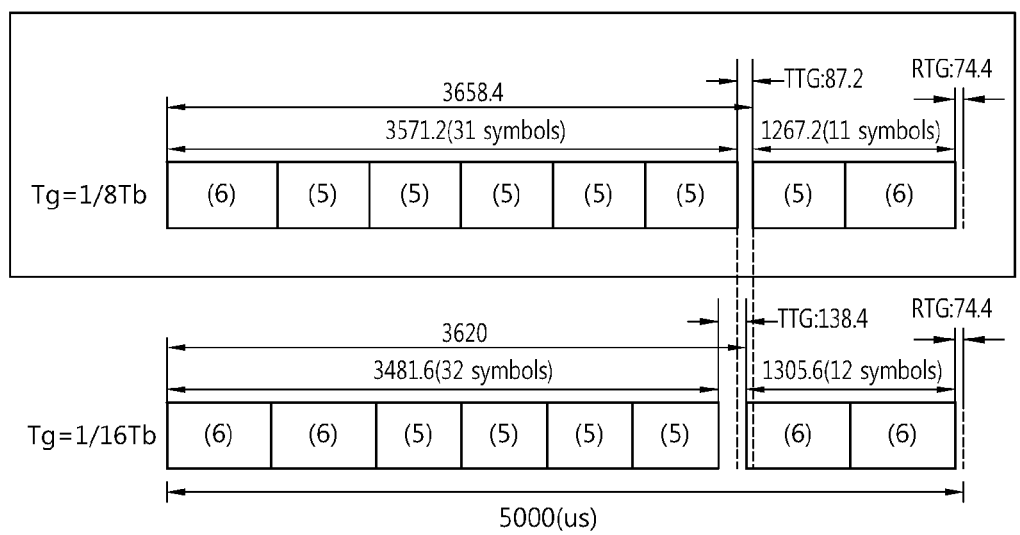
FIG. 25 shows further yet another example of a frame structure derived from the frame structure of FIG. 21.

FIG. 25 shows further yet another example of a frame structure derived from the frame structure of FIG. 21. This frame structure is a TDD frame structure.

Referring to FIG. 25, a specific frame structure having a CP length of $T_b/8$ is shown on the upper side, and the frame structure according to the present invention, having a CP length of $T_b/16$ and satisfying backward compatibility with the specific frame structure, is shown on the lower side. The ratio of downlink subframes and uplink subframes within the frame is 6:2. All exceptional subframes belong to a downlink period. A basic subframe in the downlink period and the positions of the exceptional subframes may not be identical to those shown in FIG. 25, but may be modified.

Figure 26:
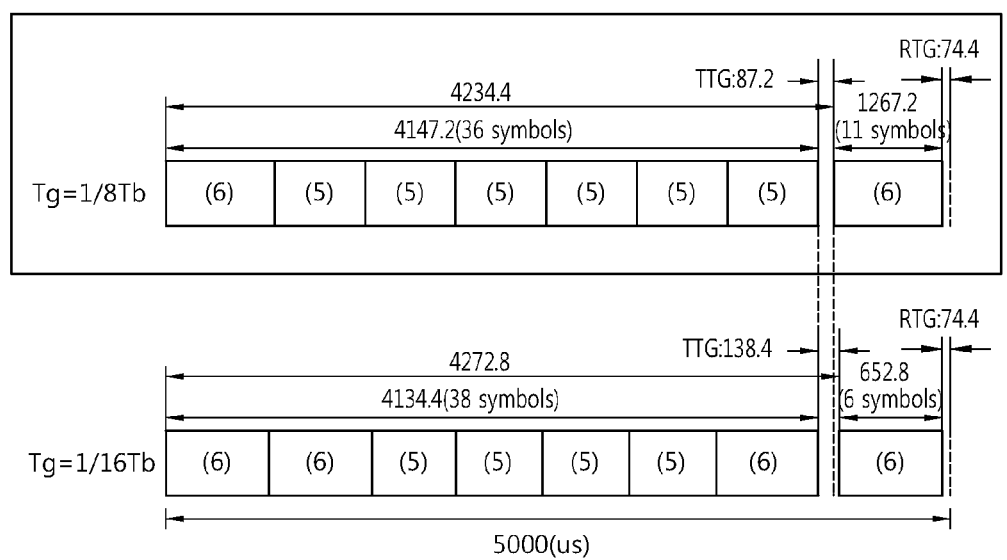
FIG. 26 shows further yet another example of a frame structure derived from the frame structure of FIG. 21.

FIG. 26 shows further yet another example of a frame structure derived from the frame structure of FIG. 21. This frame structure is a TDD frame structure.

Referring to FIG. 26, a specific frame structure having a CP length of $T_b/8$ is shown on the upper side, and the frame structure according to the present invention, having a CP length of $T_b/16$ and satisfying backward compatibility with the specific frame structure, is shown on the lower side. The ratio of downlink subframes and uplink subframes within the frame is 7:1. Accordingly, a downlink period includes 3 basic subframes.

Figure 27:
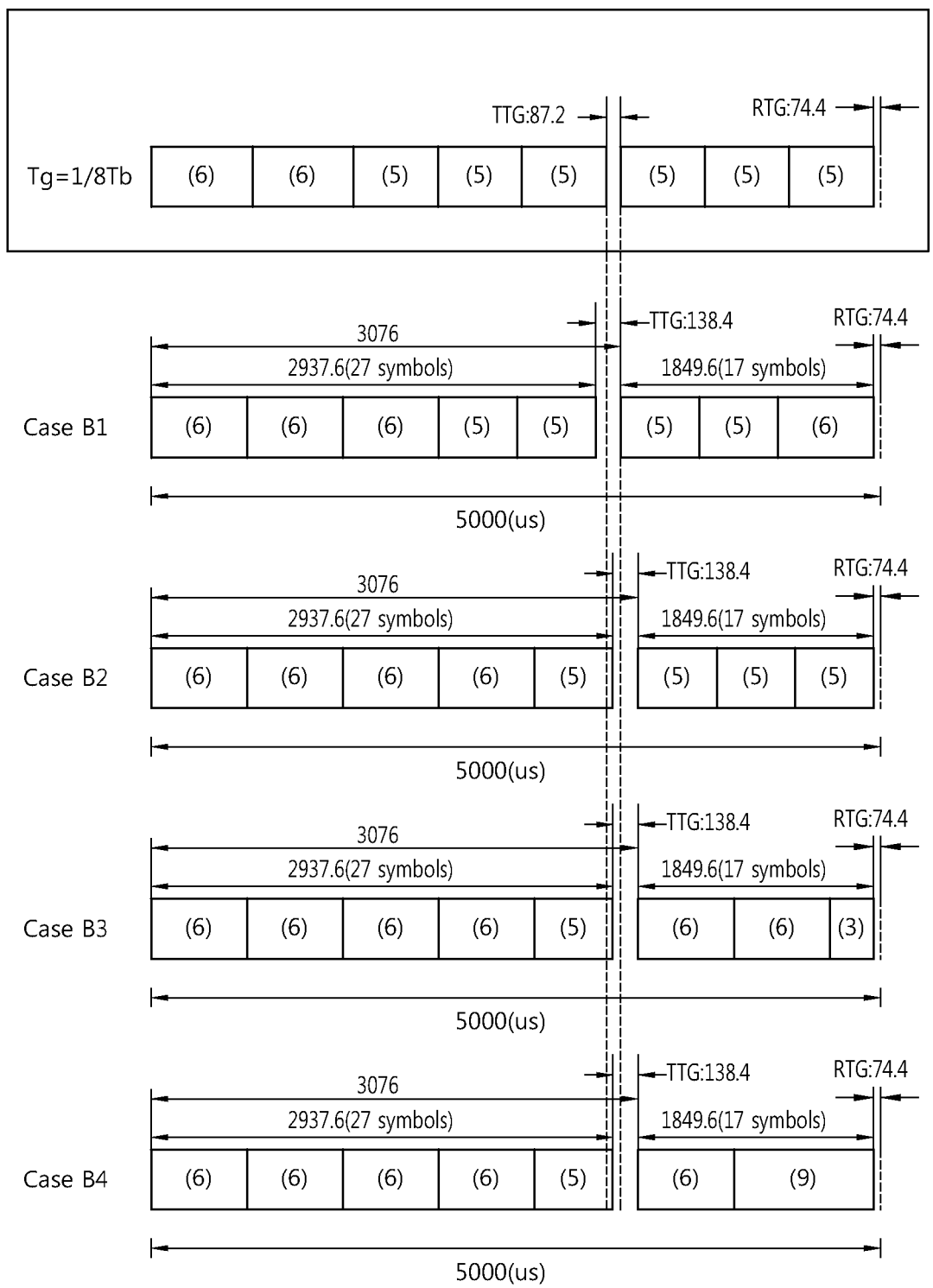
FIG. 27 shows further yet another example of frame structures derived from the frame structure of FIG. 21.

FIG. 27 shows further yet another example of frame structures derived from the frame structure of FIG. 21. This frame structure is a TDD frame structure.

Referring to FIG. 27, a frame structure shown within a box at the top is a specific frame structure having a CP length of $T_b/8$, and Cases B1 to B4 are frame structures according to the present invention, having a CP length of $T_b/16$ and satisfying backward compatibility with the specific frame structure. In Cases B1, B2, and B3, the ratio of downlink subframes and uplink subframes within the frame is 5:3. In Case B4, the ratio of downlink subframes and uplink subframes within the frame is 5:2.

The frame structure of Case B3 includes 6 basic subframes, one exceptional subframe, and one extra subframe placed at the end. The extra subframe includes 3 OFDM symbols.

The frame structure of Case B4 includes 5 basic subframes, one exceptional subframe, and one extra subframe placed at the end. The extra subframe includes 9 OFDM symbols. Cases B3 and B4 are advantageous in that the number of basic subframes can be increased to the maximum extent possible.

Figure 28:
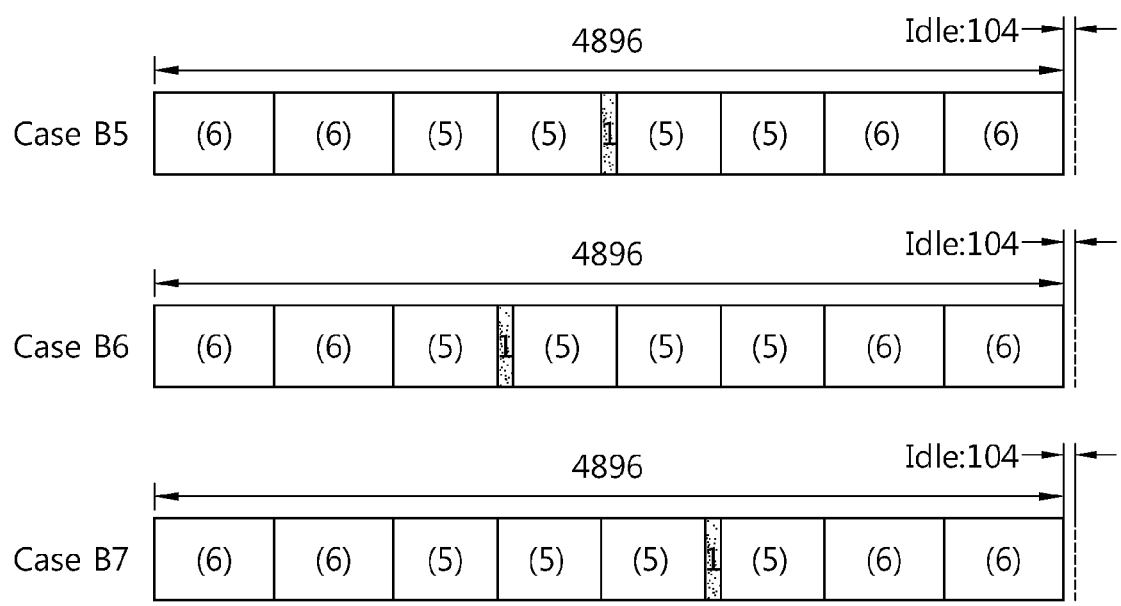
FIG. 28 shows further yet another example of frame structures derived from the frame structure of FIG. 21.

FIG. 28 shows further yet another example of frame structures derived from the frame structure of FIG. 21. This frame structure is an FDD frame structure. It is preferred that the FDD frame structure have the same form as a TDD structure. This is because in the design of a physical layer taken into consideration when a system is designed, the design of a channel for essential control information or additional control information can be reused. In the FDD structure, a TTG and an RTG, such as those in the TDD structure, are not required. Accordingly, whether one OFDM symbol will be used as a reserved gap or one exceptional subframe will be further configured without the reserved gap may be selected. FIG. 28 shows the FDD frame structure including the reserved gap.

Referring to FIG. 28, each of Cases B5 to B7 has the frame structure in which 4 basic subframes are placed at both ends of the frame two by two and 4 exceptional subframes are disposed at the center of the frame. However, the frame structures of Cases B5 to B7 differ from each other in the positions of reserved gaps. In the frame of Case B5, the reserved gap is placed between fourth and fifth subframes. In the frame of Case B6, the reserved gap is placed between third and fourth subframes. In the frame of Case B7, the reserved gap is placed between fifth and sixth subframes. The position of the reserved gap may be changed by taking an H-FDD structure.

Figure 29:
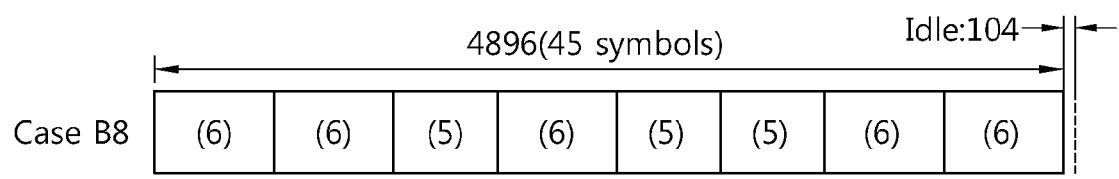
FIG. 29 shows further yet another example of a frame structure configured by the frame configuration unit according to the present invention.

FIG. 29 shows further yet another example of a frame structure configured by the frame configuration unit according to the present invention. This frame structure is an FDD frame structure in which a reserved gap is obviated and one exceptional subframe is added. Accordingly, 6k+mn=45, k=5, m=5, and n=3.

Referring to FIG. 29, the frame structure of Case B8 includes 5 basic subframes and 3 exceptional subframes. The basic subframes and the exceptional subframes are positioned by taking an H-FDD structure into consideration. When the H-FDD structure is taken into consideration, an additional idle period is necessary between groups. To this end, it is preferred that the additional space be formed through the exceptional subframe.

Figure 30:
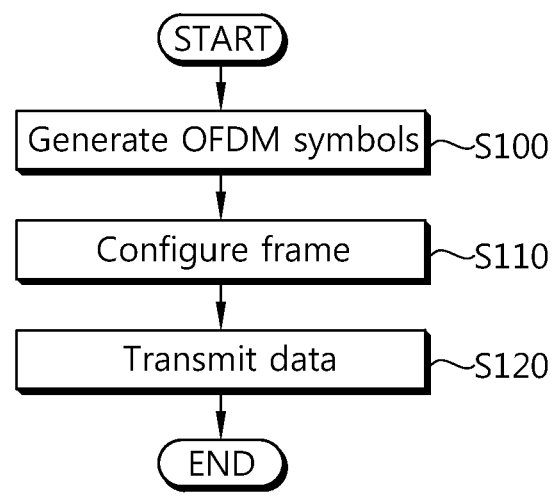
FIG. 30 is a flowchart illustrating a data transmission method according to an embodiment of the present invention.

FIG. 30 is a flowchart illustrating a data transmission method according to an embodiment of the present invention.

Referring to FIG. 30, OFDM symbols are generated by performing FFT and IFFT for an inputted modulation symbol at step S100. A frame, including k base subframes each having 6 OFDM symbols, n exceptional subframes each having m OFDM symbols, and a reserved gap having one OFDM symbol, is configured at step S110. m is any one of 5 and 7, and k=m. The configured frame may be any one of the frame structures shown in FIGS. 6 to 22. The OFDM symbols are transmitted using the configured frame at step S120.

The present invention may be implemented using hardware, software, or a combination of them. In hardware implementations, the present invention may be implemented using ASICs (Application Specific Integrated Circuits), DSPs (Digital Signal Processors), PLDs (Programmable Logic Devices), FPGAs (Field Programmable Gate Arrays), processors, controllers, microprocessors, other electronic units, or a combination of them, which are designed to perform the above-described functions. In software implementations, the present invention may be implemented using modules performing the above-described functions. Software may be stored in a memory unit and executed by a processor. The memory unit or the processor may adopt various means well known to those skilled in the art.

Although the preferred embodiments of the present invention have been described above, those having ordinary skill in the art will appreciate that the present invention may be modified in various forms without departing from the spirit and scope of the present invention defined in the appended claims. Accordingly, a possible change of the embodiments of the present invention may not deviate from the technology of the present invention.

What is claimed is:

1. A data transmission apparatus in a wireless communication system, the apparatus comprising:
   an orthogonal frequency division multiple access (OFDMA) symbol generation unit for generating a plurality of OFDMA symbols which constitute a frame including seven subframes, wherein a ratio of a cyclic prefix (CP) and a useful symbol time in each of the plurality of OFDMA symbols is 1/8; and a transmission unit for transmitting data through the frame, wherein at least one subframe among the seven subframes includes 6 OFDMA symbols and at least one other subframe among the seven subframes includes 7 OFDMA symbols;

wherein a system bandwidth of the wireless communication system is 8.75 MHz.

2. The apparatus of claim 1, wherein each subframe among the seven subframes includes a downlink (DL) frequency band for DL transmission and an uplink (UL) frequency band for UL transmission based on a frequency division duplex (FDD) scheme.

3. The apparatus of claim 2, wherein one subframe among the seven subframes includes 7 OFDMA symbols, and each of the remaining subframes among the seven subframes includes 6 OFDMA symbols.

4. The apparatus of claim 3, wherein the one subframe including 7 OFDMA symbols is a fourth subframe among the seven subframes.

5. The apparatus of claim 1, wherein the seven subframes further include a plurality of DL subframes for DL transmission and a plurality of UL subframes for UL transmission based on a time division duplex (TDD) scheme.

6. The apparatus of claim 5, wherein a transmission/reception (TX/RX) gap is inserted between the plurality of DL subframes and the plurality of UL subframes.

7. The apparatus of claim 6, wherein the TX/RX gap occupies one OFDMA symbol in the frame.

8. The apparatus of claim 5, wherein a ratio of a number of the plurality of DL subframes and a number of the plurality of UL subframes is one of 5:2, 4:3, or 3:4.

9. The apparatus of claim 5, wherein each of the plurality of DL subframes include 6 OFDMA symbols, and wherein each of the plurality of UL subframes include 6 OFDMA symbols.

10. The data transmission method in a wireless communication system, the method comprising:

generating a plurality of orthogonal frequency division multiple access (OFDMA) symbols which constitute a frame including seven subframes, wherein a ratio of a cyclic prefix (CP) and a useful symbol time in each of the plurality of OFDMA symbols is 1/8; and transmitting data through the frame, wherein at least one subframe among the seven subframes includes 6 OFDMA symbols and at least one other subframe among the seven subframes includes 7 OFDMA symbols; and wherein a system bandwidth of the wireless communication system is 8.75 MHz.

11. The method of claim 10, wherein each subframe among the seven subframes includes a downlink (DL) frequency band for DL transmission and an uplink (UL) frequency band for UL transmission based on a frequency division duplex (FDD) scheme.

12. The method of claim 10, wherein the seven subframes include a plurality of DL subframes for DL transmission and a plurality of UL subframes for UL transmission based on a time division duplex (TDD) scheme.

* * * * *